United States Patent
Ninomiya et al.

(10) Patent No.: US 10,317,830 B1
(45) Date of Patent: Jun. 11, 2019

(54) IMAGE FORMING APPARATUS AND IMAGE FORMING UNIT

(71) Applicant: FUJI XEROX CO., LTD., Tokyo (JP)

(72) Inventors: Yosuke Ninomiya, Kanagawa (JP); Keita Hashimoto, Kanagawa (JP); Sho Watanabe, Kanagawa (JP); Akira Shimodaira, Kanagawa (JP); Toshihiro Goda, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 16/043,232

(22) Filed: Jul. 24, 2018

(30) Foreign Application Priority Data

Jan. 25, 2018 (JP) .................................. 2018-010739
Jan. 29, 2018 (JP) .................................. 2018-012517

(51) Int. Cl.
| | | |
|---|---|---|
| G03G 15/01 | (2006.01) | |
| G03G 15/20 | (2006.01) | |
| H04N 1/12 | (2006.01) | |
| G03G 15/08 | (2006.01) | |
| G03G 15/00 | (2006.01) | |
| G03G 15/16 | (2006.01) | |

(52) U.S. Cl.
CPC ..... *G03G 15/2064* (2013.01); *G03G 15/0865* (2013.01); *G03G 15/16* (2013.01); *G03G 15/602* (2013.01); *H04N 1/12* (2013.01); *H04N 2201/0082* (2013.01)

(58) Field of Classification Search
CPC .......... G03G 15/2064; G03G 15/0865; G03G 15/16; G03G 15/602; H04N 1/12; H04N 2201/0082
See application file for complete search history.

(56) References Cited

U.S. PATENT DOCUMENTS

| | | | |
|---|---|---|---|
| 2007/0139747 A1 | 6/2007 | Nakahara | |
| 2012/0051811 A1* | 3/2012 | Hosoi | G03G 15/2021 399/341 |
| 2012/0051815 A1* | 3/2012 | Satomi | G03G 15/2064 399/341 |

FOREIGN PATENT DOCUMENTS

| | | |
|---|---|---|
| JP | 10-198106 A | 7/1998 |
| JP | 2004-205944 A | 7/2004 |
| JP | 2006-251722 A | 9/2006 |
| JP | 2007-171498 A | 7/2007 |

* cited by examiner

*Primary Examiner* — Hoang X Ngo
(74) *Attorney, Agent, or Firm* — Sughrue Mion, PLLC

(57) ABSTRACT

An image forming apparatus includes: a first image forming part that forms an image on one surface of a recording material; and a second image forming part provided at an upper side of the first image forming part in a gravitational direction, the second image forming part that transports the recording material received from the first image forming part such that the one surface faces downward in the gravitational direction and that forms an image on the one surface from a lower side in the gravitational direction.

20 Claims, 8 Drawing Sheets

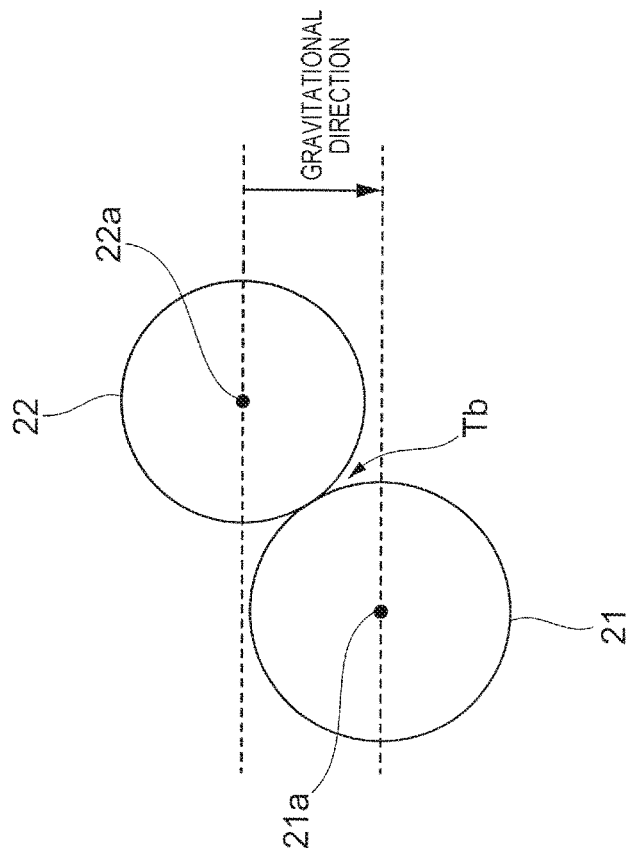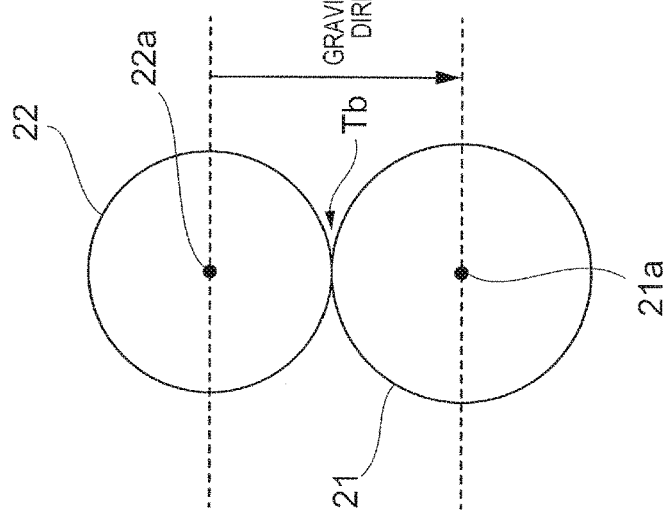

IMAGE FORMING APPARATUS AND IMAGE FORMING UNIT

CROSS-REFERENCE TO RELATED APPLICATIONS

This application is based on and claims priority under 35 USC 119 from Japanese Patent Application No. 2018-012517 filed Jan. 29, 2018 and Japanese Patent Application No. 2018-010739 filed Jan. 25, 2018.

BACKGROUND

(i) Technical Field

The present invention relates to an image forming apparatus and an image forming unit.

(ii) Related Art

As the related art, JP-A-2004-205944 discloses a printer that forms a color image on a recording sheet and includes a black image forming unit in which a black image is transferred onto a recording sheet, and a chromatic color image forming unit in which images of respective colors are transferred onto a recording sheet.

For example, in an image forming apparatus including a second image forming part that forms a spot color image, for example, in addition to a first image forming part that forms YMCK images, for example, for the purpose of reducing an installation area, for example, the second image forming part may be provided at the upper side of the first image forming part in the gravitational direction.

JP-A-10-198106 discloses a complex printer apparatus in which a monochrome printer device and a color printer device are disposed so as to overlap each other in the gravitational direction.

SUMMARY

However, in a case where the second image forming part is provided at the upper side of the first image forming part in the gravitational direction, for example, when the second image forming part is configured to form an image from the horizontal direction on a recording material transported upward in the gravitational direction, the dimension in the gravitational direction of the image forming apparatus tends to be large.

An aspect of non-limiting embodiments of the present disclosure relates to reducing the dimension in the gravitational direction of an image forming apparatus in which a second image forming part is provided at an upper side of a first image forming part in the gravitational direction, as compared with a case where the second image forming part forms an image from a horizontal direction on a recording material transported upward in the gravitational direction.

For example, in an image forming apparatus including a second image forming part that forms a spot color image, for example, in addition to a first image forming part that forms YMCK images, for example, for the purpose of reducing an installation area, for example, the second image forming part may be provided at the upper side of the first image forming part in the gravitational direction.

In a case where the second image forming part is provided at the upper side of the first image forming part in the gravitational direction, from the viewpoint of preventing, for example, rubbing of an image formation surface of a recording material, in the second image forming part, the image formation surface may face upward in the gravitational direction. However, when the image formation surface faces upward in the gravitational direction in the second image forming part, it may be difficult to form an image on the same surface of the recording material in the first image forming part and the second image forming part according to, for example, a configuration or arrangement of the first image forming part and the second image forming part.

Another aspect of non-limiting embodiments of the present disclosure relates to forming an image on an identical surface of a recording material by a first image forming part and a second image forming part of an image forming apparatus, in which the second image forming part is provided at an upper side of the first image forming part in the gravitational direction, while preventing rubbing of an image as compared with a case where the second image forming part forms an image from the lower side in the gravitational direction.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image forming apparatus including: a first image forming part that forms an image on one surface of a recording material; and a second image forming part provided at an upper side of the first image forming part in a gravitational direction, the second image forming part that transports the recording material received from the first image forming part such that the one surface faces downward in the gravitational direction and that forms an image on the one surface from a lower side in the gravitational direction.

BRIEF DESCRIPTION OF THE DRAWINGS

Exemplary embodiment(s) of the present invention will be described in detail based on the following figures, wherein:

FIGS. 3A and 3B are views for explaining an arrangement of a photoconductor drum and a transfer roller in a second image forming part;

DETAILED DESCRIPTION

Hereinafter, exemplary embodiments of the present invention will be described in detail with reference to the accompanying drawings.

First Exemplary Embodiment

Figure 1:
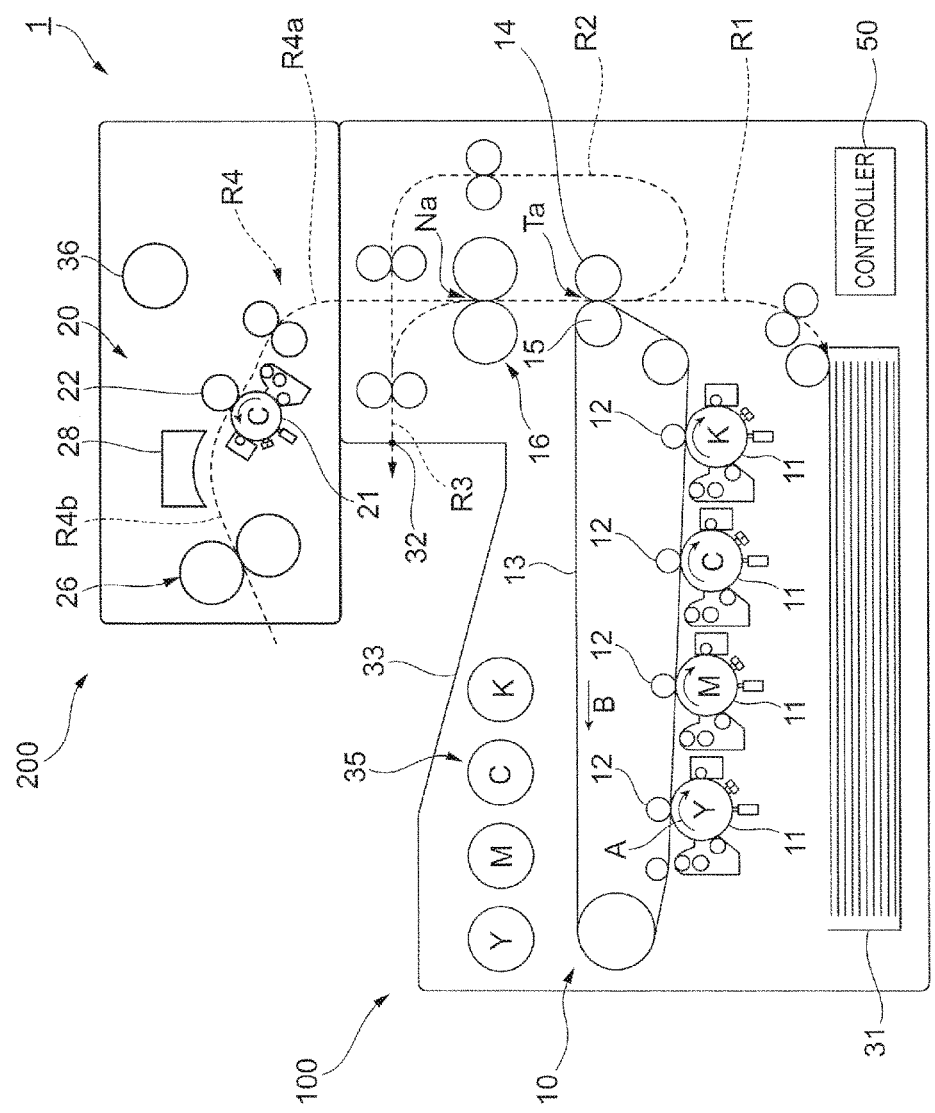
FIG. 1 is a view illustrating an overall configuration of an image forming apparatus according to a first exemplary embodiment.

FIG. 1 is a view illustrating an overall configuration of an image forming apparatus 1 according to a first exemplary embodiment. The image forming apparatus 1, illustrated in FIG. 1, includes a first image forming unit 100 that forms images of yellow (Y), magenta (M), cyan (C), and black (K) (hereinafter, these colors being referred to as "ordinary colors" in some cases) on a sheet as an exemplary recording material. In addition, the image forming apparatus 1 includes a second image forming unit 200 that overlaps the first image forming unit 100 at the upper side in the gravitational direction (the upper side in FIG. 1) and forms an image of a spot color, different from the ordinary colors, on the sheet transported from the first image forming unit 100.

The image forming apparatus 1 of the present exemplary embodiment may perform formation of images of the ordinary colors, that is, yellow, magenta, cyan, and black, and may also perform formation of an image in which a spot color image further is superimposed on the ordinary color images.

In addition, in this example, the second image forming unit 200 is detachably provided with respect to the first image forming unit 100. Then, when the second image forming unit 200 is detached from the first image forming unit 100, the first image forming unit 100 may be used alone as a color printer that forms yellow, magenta, cyan, and black images.

The first image forming unit 100 is a so-called tandem type color printer. The first image forming unit 100 includes a first image forming part 10 that forms an image on a sheet according to image data. In addition, the first image forming unit 100 includes a sheet supply part 31 that supplies a sheet to the first image forming part 10, a sheet discharge part 32 as an exemplary discharge part, from which a sheet, on which an image is formed in the first image forming part 10 or a second image forming part 20 to be described later is discharged, and a sheet stacking part 33 on which the sheet discharged from the sheet discharge part 32 is stacked. In addition, the first image forming unit 100 includes toner cartridges 35 that correspond to respective colors, such as yellow, magenta, cyan and black, and supply toners of the respective colors to the first image forming part 10.

Moreover, the first image forming unit 100 includes a controller 50 that controls an overall operation of the image forming apparatus 1.

In addition, the first image forming unit 100 is provided with a first sheet transport path R1 that transports a sheet from the sheet supply part 31 toward the sheet discharge part 32 through the first image forming part 10. In addition, the first image forming unit 100 is provided with a sheet inverting path R2 that inverts a sheet, on which an image is formed by the first image forming part 10, and again transports the sheet to the first image forming part 10. Moreover, the first image forming unit 100 is provided with a sheet delivery path R3 that is connected to the first sheet transport path R1 downstream of a first fixing device 16 to be described later and delivers a sheet, passed through the first image forming part 10, to the second image forming unit 200.

The first sheet transport path R1 is formed so as to extend upward in the gravitational direction from the sheet supply part 31 toward the first image forming part 10 and then extend in the horizontal direction toward the sheet discharge part 32. In addition, the sheet delivery path R3 extends upward in the gravitational direction from a connecting portion with the first sheet transport path R1 toward the second image forming unit 200.

The first image forming part 10 includes four photoconductor drums 11 disposed in parallel in the horizontal direction so as to correspond to respective colors, such as yellow, magenta, cyan, and black, four primary transfer rollers 12 disposed so as to correspond to the respective photoconductor drums 11, an intermediate transfer belt 13 onto which toner images formed on the respective photoconductor drums 11 are sequentially transferred, a secondary transfer roller 14 as an exemplary first toner image forming part that secondarily transfers the toner images, which are primarily transferred onto the intermediate transfer belt 13, onto a sheet, and a backup roller 15 disposed so as to face the secondary transfer roller 14 with the intermediate transfer belt 13 interposed therebetween.

In addition, the first image forming part 10 includes the first fixing device 16 as an exemplary first fixing part that fixes the secondarily transferred toner images on the sheet.

Each of the photoconductor drums 11 is driven to rotate in a predetermined direction (direction of an arrow A in FIG. 1) by a driving unit (not illustrated).

In addition, around each of the photoconductor drums 11, for example, a charging device that charges the surface of the photoconductor drum 11, an exposure device that forms an electrostatic latent image by exposing the surface of the photoconductor drum 11 charged by the charging device, a developing device that develops and visualizes the electrostatic latent image formed on the photoconductor drum 11 with a toner of each color, and a cleaner that removes the toner remaining on the photoconductor drum 11 after primary transfer are sequentially disposed (none of which is illustrated).

Each of the primary transfer rollers 12 is disposed so as to face the corresponding photoconductor drum 11 via the intermediate transfer belt 13. The primary transfer rollers 12 primarily transfer the toner image formed on the corresponding photoconductor drum 11 onto the intermediate transfer belt 13.

The intermediate transfer belt 13 is rotatably wound around the primary transfer rollers 12 and plural support rollers (not illustrated). Then, the intermediate transfer belt 13 is driven to rotate in the direction of an arrow B by a driving roller (not illustrated) among the plural support rollers.

The secondary transfer roller 14 faces the intermediate transfer belt 13, and is pressed against the backup roller 15 via the intermediate transfer belt 13. The secondary transfer roller 14 forms a secondary transfer portion Ta between the secondary transfer roller 14 and the backup roller 15. Then, in the secondary transfer portion Ta, a transfer voltage is applied to the secondary transfer roller 14 or the backup roller 15 by a power supply (not illustrated), and the secondary transfer roller 14 secondarily transfers (collectively transfers) the toner images of the respective colors, which are sequentially primarily transferred onto the intermediate transfer belt 13, onto the sheet in the secondary transfer portion Ta. In this example, the secondary transfer roller 14 secondarily transfers the toner images from the left side in the drawing to the sheet, which is supplied from the sheet supply part 31 and transported along the first sheet transport path R1.

The first fixing device 16 includes a heating member having a heating source such as, for example, a halogen lamp, a resistance heating element, or an induction heating coil, and a pressurizing member that forms a pressurizing portion Na between the heating member and the pressurizing member, and fixes the toner image on the sheet using heat and pressure by passing the sheet through the pressurizing portion Na.

In addition, although will be described later in detail, the sheet, on which the toner image is fixed by the first fixing device 16, is transported upward in the gravitational direction in a state where an image formation surface faces the left side in the drawing.

Figure 2:
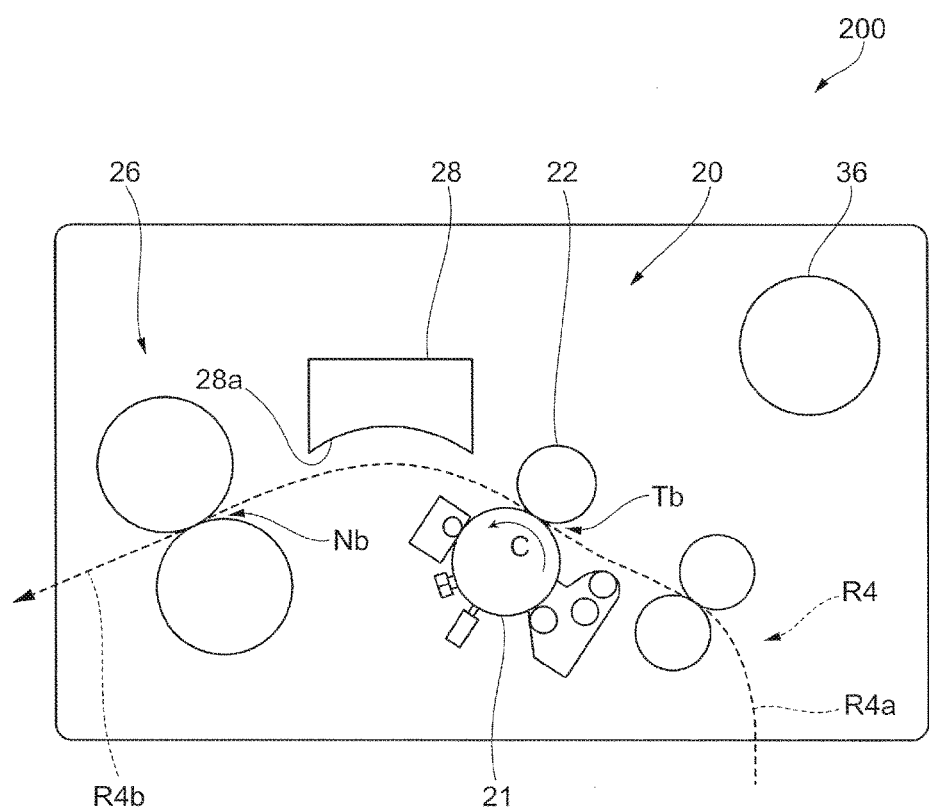
FIG. 2 is a view illustrating a configuration of a second image forming unit according to the first exemplary embodiment.

FIG. 2 is a view illustrating a configuration of the second image forming unit 200 according to the first exemplary embodiment.

The second image forming unit 200 is an exemplary image forming unit, and is a so-called direct transfer type single color printer that forms a spot color image on a sheet. Here, the spot color is a color different from an ordinary color, and for example, may be a color that is difficult to be realized from toners of ordinary colors, that is, yellow, magenta, cyan and black. Specifically, examples of such a spot color may include a metallic color such as gold and silver, which are colored using a metallic pigment, in addition to white, a transparent color, light cyan, light magenta, orange, violet, and green. It should be noted that the spot color are not limited to these examples.

As illustrated in FIG. 2, the second image forming unit 200 includes the second image forming part 20 that forms an image on the sheet from the lower side in the gravitational direction according to image data.

In addition, the second image forming unit 200 includes a toner cartridge 36 that supplies a toner to the second image forming part 20. In this example, the toner cartridge 36 is provided at a position deviated in the horizontal direction from the second image forming part 20. More specifically, the toner cartridge 36 is provided at a position deviated from the second image forming part 20 so as to be spaced far away from a second fixing device 26 to be described later. Thus, in the image forming apparatus 1 according to the present exemplary embodiment, as compared with a case where the toner cartridge 36 and the second image forming part 20 are disposed so as to overlap each other in the gravitational direction, the dimension in the gravitational direction of the second image forming unit 200 may be reduced. In addition, as compared with a case where the toner cartridge 36 is provided at a position close to the second fixing device 26, deterioration of the toner due to heat from the second fixing device 26 is prevented.

In addition, the second image forming unit 200 is provided with a second sheet transport path R4 as an exemplary transport part that transports the sheet, received from the sheet delivery path R3 of the first image forming unit 100, to the sheet stacking part 33 through the second image forming part 20. The second sheet transport path R4 includes an upstream portion R4a that receives the sheet from the sheet delivery path of the first image forming unit 100 and transports the sheet upward in the gravitational direction, and a downstream portion R4b that extends in the horizontal direction through the second image forming part 20 from the upper end of the upstream portion R4a in the gravitational direction and transports the sheet toward the sheet stacking part 33.

In the second image forming unit 200 of the present exemplary embodiment, the second image forming part 20 is provided in the downstream portion R4b of the second sheet transport path R4. In the downstream portion R4b of the second sheet transport path R4, the sheet is transported such that an image formation surface, on which an image is formed by the second image forming part 20, faces downward in the gravitational direction. Then, in the second image forming part 20, an image is formed on the sheet from the lower side in the gravitational direction.

In the present exemplary embodiment, since the second image forming part 20 is configured to form an image from the lower side in the gravitational direction in the downstream portion R4b of the second sheet transport path R4, for example, as compared with a case where the second image forming part 20 forms an image from the horizontal direction in the upstream portion R4a, it is possible to shorten the length of the upstream portion R4a extending in the gravitational direction. This makes it possible to reduce the dimension in the gravitational direction of the second image forming unit 200 and the entire image forming apparatus 1, as compared with a case where the second image forming part 20 forms an image from the horizontal direction in the upstream portion R4a.

When the second image forming part 20 is configured to form an image from the lower side in the gravitational direction, as compared with a case where the second image forming part 20 forms an image from the horizontal direction, the dimension in the horizontal direction of the second image forming unit 200 may be increased. However, since the number of constituent members of the second image forming unit 200 is less than that of the first image forming unit 100, the dimension in the horizontal direction of the second image forming unit 200 is less likely to be larger than that of the first image forming unit 100. Thus, even when the second image forming part 20 is configured to form an image from the lower side in the gravitational direction, an increase in the dimension in the horizontal direction of the entire image forming apparatus 1 is prevented.

The second image forming part 20 includes a photoconductor drum 21, a transfer roller 22 as an exemplary toner image forming part or second toner image forming part that forms a transfer portion Tb between the photoconductor drum 21 and the transfer roller 22 and transfers a toner image formed on the photoconductor drum 21 onto a sheet, and a second fixing device 26 as an exemplary fixing part or second fixing part that fixes the transferred toner image on the sheet. In addition, the second image forming part 20 includes a guide part 28 that guides the sheet, onto which the toner image is transferred in the transfer portion Tb and transported toward the second fixing device 26.

The photoconductor drum 21 is driven to rotate in a predetermined direction (direction of an arrow C in FIGS. 1 and 2) by a driving unit (not illustrated).

In addition, around the photoconductor drum 21, for example, a charging device that charges the surface of the photoconductor drum 21, an exposure device that forms an electrostatic latent image by exposing the surface of the photoconductor drum 21 charged by the charging device, a developing device that develops and visualizes the electrostatic latent image formed on the photoconductor drum 21 using a toner, and a cleaner that removes the toner remaining on the photoconductor drum 21 after transfer are sequentially disposed (none of which is illustrated).

As described above, in the second image forming part 20, the image formation surface of the sheet is transported so as to face downward in the gravitational direction in the transfer portion Tb. Then, the second image forming part 20 forms an image on the sheet transported from the first image forming unit 100, from the lower side in the gravitational direction in the transfer portion Tb.

FIGS. 3A and 3B are views for explaining an arrangement of the photoconductor drum 21 and the transfer roller 22 in the second image forming part 20, and are views illustrating an exemplary arrangement of the photoconductor drum 21 and the transfer roller 22.

In a case where the transfer portion Tb is formed by the photoconductor drum 21 and the transfer roller 22, which rotate, as in the present exemplary embodiment, the phrase "forming an image from the lower side in the gravitational direction in the transfer portion Tb" means that the photoconductor drum 21 that holds a toner image is disposed lower than the transfer roller 22 in the gravitational direction. More specifically, this means that a rotation center 21a of the photoconductor drum 21 is located lower than a rotation center 22a of the transfer roller 22 in the gravitational direction.

Thus, a case where an image is formed from the lower side in the gravitational direction in the transfer portion Tb includes, for example, a mode in which the entire photoconductor drum 21 is located lower than the transfer roller 22 in the gravitational direction as illustrated in FIG. 3A, and a mode in which positions of the photoconductor drum 21 and the transfer roller 22 in the gravitational direction partially overlap each other as illustrated in FIG. 3B.

In the present exemplary embodiment, the phrase "the image formation surface of the sheet faces downward in the gravitational direction" means that a direction in which the image formation surface faces in the transfer portion Tb (perpendicular to the image formation surface in the transfer portion Tb) has at least a downward component of the gravitational direction.

Returning to FIG. 2, in the second image forming part 20 of the present exemplary embodiment, as in an example illustrated in FIG. 3B, the photoconductor drum 21 and the transfer roller 22 are disposed such that the positions thereof in the gravitational direction partially overlap. Therefore, in the second image forming part 20, as illustrated in FIG. 2, the transport direction of the sheet in the transfer portion Tb is tilted upward in the gravitational direction relative to the horizontal direction.

In addition, the second fixing device 26 includes a heating member having a heating source such as, for example, a halogen lamp, a resistance heating element, or an induction heating coil, and a pressurizing member forming a pressurizing portion Nb between the heating member and the pressurizing member. The second fixing device 26 fixes the toner image on the sheet using heat and pressure by passing the sheet through the pressurizing portion Nb. In the second fixing device 26 of the present exemplary embodiment, as illustrated in FIG. 2, the transport direction of the sheet in the pressurizing portion Nb is tilted downward in the gravitational direction relative to the horizontal direction.

The guide part 28 guides the transport of the sheet between the transfer portion Tb and the pressurizing portion Nb. More specifically, the guide part 28 changes the transport direction of the sheet, onto which the toner image is transferred in the transfer portion Tb and which is tilted and transported upward in the gravitational direction, so that the sheet is tilted downward in the gravitational direction toward the pressurizing portion Nb.

The guide part 28 of the present exemplary embodiment comes into contact with the sheet to guide the transport of the sheet. The guide part 28 is formed with a circular arc-shaped guide surface 28a, which is recessed upward in the gravitational direction in a portion facing the downstream portion R4b of the second sheet transport path R4.

The guide surface 28a comes into contact with an opposite surface (the other surface) of the sheet to the image formation surface (one surface) of the sheet, which is tilted and transported upward in the gravitational direction from the transfer portion Tb, thereby guiding the sheet to the pressurizing portion Nb in a manner such that the sheet has a shape that bulges upward in the gravitational direction and the tip end of the sheet is tilted downward in the gravitational direction. Since the guide surface 28a is a curved surface having a circular arc shape, the guide part 28 of the present exemplary embodiment may smoothly guide the sheet, as compared with a case where the guide surface 28a is configured with, for example, a flat surface that is bent to have an inverted V-shaped form.

The shape of the guide part 28, which comes into contact with the sheet to guide the transport of the sheet, is not limited to the shape illustrated in FIG. 2 as long as the guide part 28 comes into contact with the sheet and changes the traveling direction of the sheet, which is transported from the transfer portion Tb, to a direction that is tilted downward in the gravitational direction. In addition, the guide part 28 may be configured with plural members.

Moreover, the guide part 28 may use, for example, a star wheel that comes into partial contact with the image formation surface of the sheet to guide the transport of the sheet.

As described above, in the present exemplary embodiment, the second sheet transport path R4 (the downstream portion R4b) between the transfer portion Tb and the pressurizing portion Nb, in which the sheet is guided by the guide part 28, has a shape that bulges upward in the gravitational direction. In other words, in the second sheet transport path R4 (the downstream portion R4b) between the transfer portion Tb and the pressurizing portion Nb, the transport direction of the sheet changes from a direction that is tilted upward in the gravitational direction to a direction that is tilted downward in the gravitational direction.

Therefore, for example, as compared with a case where the second sheet transport path R4 (the downstream portion R4b) between the transfer portion Tb and the pressurizing portion Nb does not bulge upward in the gravitational direction along the horizontal direction, it is possible to increase the distance between the image formation surface of the sheet, onto which the toner image is transferred in the transfer portion Tb, and for example, a guide (not illustrated) provided at the lower side of the second sheet transport path R4 (the downstream portion R4b) in the gravitational direction. As a result, an unfixed toner image transferred to the sheet in the transfer portion Tb is prevented from coming into contact with, for example, the guide provided at the lower side of the second sheet transport path R4 (the downstream portion R4b) in the gravitational direction. Then, for example, rubbing of an image or scattering of an image due to contact between the unfixed toner image and the guide is prevented.

In addition, in the second image forming part 20, as described above, since the transport direction in the transfer portion Tb is tilted upward in the gravitational direction relative to the horizontal direction, the sheet discharged from the transfer portion Tb easily has a shape that bulges upward in the gravitational direction in the second sheet transport path R4 (the downstream portion R4b) between the transfer portion Tb and the pressurizing portion Nb.

Further, in the second image forming part 20 as described above, since the transport direction in the pressurizing portion Nb is tilted downward in the gravitational direction relative to the horizontal direction, the sheet, the transport direction of which is changed downward in the gravitational direction in the second sheet transport path R4 (the downstream portion R4b) between the transfer portion Tb and the pressurizing portion Nb, is easily transported to the pressurizing portion Nb.

In addition, the second image forming unit 200 does not include a stacking part on which sheets are stacked. As will be described in detail later, the sheet, on which a spot color image is formed by the second image forming part 20, is transported along the downstream portion R4b of the second sheet transport path R4 and is stacked on the sheet stacking part 33 provided in the first image forming unit 100. This makes it possible to simplify a configuration of the image forming apparatus 1, as compared with a case where, for example, a stacking part on which sheets are stacked is provided in each of the first image forming unit 100 and the second image forming unit 200.

Next, an image forming operation performed by the image forming apparatus 1 of the present exemplary embodiment will be described. The image forming operation described below is executed based on the control of the controller 50.

First, an operation of the image forming apparatus 1 in a case where an ordinary color image is formed on one surface of the sheet by the first image forming unit 100 (the first image forming part 10), and thereafter, a spot color image is formed and superimposed by the second image forming unit 200 (the second image forming part 20) on the one surface of the sheet, on which the ordinary color image is formed, will be described.

In the image forming apparatus 1, image data received from, for example, a PC (not illustrated) is subjected to image processing by the controller 50, and is supplied to the first image forming part 10 of the first image forming unit 100 and to the second image forming part 20 of the second image forming unit 200.

In the first image forming part 10 of the first image forming unit 100, the respective photoconductor drums 11, which correspond to respective ordinary colors, are charged to a predetermined potential by the charging device while rotating in the direction of the arrow A, and are exposed by the exposure device, which emits light based on the image data supplied from the controller 50. Therefore, electrostatic latent images regarding respective color images are formed on the respective photoconductor drums 11. Then, the electrostatic latent images formed on the photoconductor drums 11 are developed by the developing device, whereby respective yellow, magenta, cyan, and black toner images are formed on the respective photoconductor drums 11.

The respective color toner images formed on the respective photoconductor drums 11 are multi-transferred using the respective primary transfer rollers 12 to the intermediate transfer belt 13, which moves in the direction of the arrow B.

In addition, in accordance with a timing at which the toner images multi-transferred to the intermediate transfer belt 13 reach the secondary transfer roller 14, the sheet is transported from the sheet supply part 31 to the secondary transfer portion Ta through the first sheet transport path R1. Then, the ordinary color toner images on the intermediate transfer belt 13 are collectively transferred onto one surface of the sheet by the secondary transfer roller 14 in the secondary transfer portion Ta.

Thereafter, the sheet, onto which the ordinary color toner images are transferred, is separated from the intermediate transfer belt 13, and is transported upward in the gravitational direction along the first sheet transport path R1 so as to reach the first fixing device 16. The ordinary color toner images on the sheet transported to the first fixing device 16 are subjected to a fixing process using heat and pressure by the first fixing device 16 so as to be fixed on the sheet. Then, the sheet on which the ordinary color toner images are fixed are transported upward in the gravitational direction in a state where the image formation surface faces the horizontal direction (in this example, the left side in the drawing), and is delivered to the second image forming unit 200 through the sheet delivery path R3.

In the second image forming unit 200, the sheet delivered from the first image forming unit 100 is transported along the second sheet transport path R4. Specifically, the sheet is transported upward in the gravitational direction along the upstream portion R4a of the second sheet transport path R4 with the image formation surface, on which the ordinary color toner images are formed, facing toward the left side in the drawing. Subsequently, the sheet changes the traveling direction thereof along the downstream portion R4b of the second sheet transport path R4 so as to be transported to the left side in the drawing in the horizontal direction with the image formation surface facing downward in the gravitational direction, thereby reaching the transfer portion Tb.

In addition, in the second image forming part 20 of the second image forming unit 200, the photoconductor drum 21 is charged to a predetermined potential by the charging device while rotating in the direction of the arrow C, and is exposed by the exposure device, which emits light based on the image data supplied from the controller 50. Therefore, an electrostatic latent image regarding a spot color image is formed on the photoconductor drum 21. Then, the electrostatic latent image formed on the photoconductor drum 21 is developed by the developing device, whereby a spot color toner image is formed on the photoconductor drum 21.

Then, the spot color toner image formed on the photoconductor drum 21 is electrostatically transferred to the image formation surface, which faces downward in the gravitational direction, of the sheet transported to the transfer portion Tb, from the lower side in the gravitational direction by the transfer roller 22.

Thereafter, the sheet to which the spot color toner image is transferred is peeled off from the surface of the photoconductor drum 21, and is transported to the second fixing device 26 along the downstream portion R4b of the second sheet transport path R4 with the image formation surface facing downward in the gravitational direction. At this time, since the sheet is transported in a shape that bulges upward in the gravitational direction by the guide part 28, the image formation surface is prevented from coming into contact with, for example, the guide provided below the second sheet transport path R4 (the downstream portion R4b) in the gravitational direction.

The toner images on the sheet transported to the second fixing device 26 are subjected to a fixing process using heat and pressure by the second fixing device 26 so as to be fixed on the sheet. Then, the sheet on which the fixed ordinary color and spot color images are formed is transported along the second sheet transport path R4 in a state where the image formation surface faces downward in the gravitational direction, and is discharged to the sheet stacking part 33 provided in the first image forming unit 100.

In this manner, an image forming process is repeatedly executed for the number of cycles corresponding to the number of prints.

When forming a superimposed image of an ordinary color image and a spot color image on one surface of the sheet as described above, both the first fixing device 16 of the first image forming unit 100 and the second fixing device 26 of the second image forming unit 200 perform a fixing process. The first fixing device 16 or the second fixing device 26 requires electric power in order to generate heat required for the fixing process. Then, in a case where the peaks in the first fixing device 16 and the second fixing device 26, at which the electric power that generates heat required for the fixing process becomes large, overlap each other, the power burden of the image forming apparatus 1 tends to be large. Therefore, in the present exemplary embodiment, the peak of electric power that generates heat in the first fixing device 16 and the peak of t electric power that generates heat in the second fixing device 26 may be shifted based on the control of the controller 50.

Next, an operation in a case where only an ordinary color image is formed on one surface of the sheet by the first image forming unit 100 (the first image forming part 10) and no spot color image is formed by the second image forming unit 200 (the second image forming part 20) will be described.

In the first image forming part 10 of the first image forming unit 100, an image forming operation is performed as in the above-described example, and ordinary color toner images are collectively transferred onto one surface of the sheet in the secondary transfer portion Ta. Thereafter, the sheet, onto which the ordinary color toner images are transferred, is transported to the first fixing device 16, and is subjected to a fixing process using heat and pressure by the first fixing device 16 so that the images are fixed on the sheet.

Then, the sheet, on which the ordinary color toner images are fixed, is transported along the first sheet transport path R1, and is discharged to the sheet stacking part 33 via the sheet discharge part 32 in a state where the image formation surface faces downward in the gravitational direction. In this manner, an image forming process is repeatedly executed for the number of cycles corresponding to the number of prints.

In the image forming apparatus 1 according to the present exemplary embodiment, when forming only an ordinary color image on a sheet without forming a spot color image, the sheet is discharged directly to the sheet stacking part 33 without passing through the second image forming unit 200. Therefore, as compared with a case of discharging a sheet through the second image forming unit 200, it is possible to shorten a sheet transport path, which may improve productivity.

However, depending on the type of sheet or the image density, for example, the fixing characteristics of the toner image on the sheet may be different. For example, when an image is formed on a sheet having a large basis weight or when the image density is high, the fixing characteristics of the toner image on the sheet tends to be low. In such a case, a greater amount of heat and pressure may be applied to the sheet in order to enhance the fixing characteristics of the toner image on the paper. In addition, in the case of increasing the gloss (glossiness) of an image formed on the sheet, a greater amount of heat and pressure may be applied to the sheet.

In the image forming apparatus 1 according to the present exemplary embodiment, when it is necessary to apply a greater amount of heat to the sheet, based on the control of the controller 50, the sheet, on which the fixing process is performed by the first fixing device 16, is transported to the second image forming unit 200. Then, a fixing process using heat and pressure is again performed by the second fixing device 26 of the second image forming unit 200. Therefore, even when an image is formed on a sheet having a large basis weight or even when the image density is high, for example, the occurrence of a fixing defect may be prevented as compared with a case where the fixing process is not performed again by the second fixing device 26. In addition, as compared with the case where the fixing process is not performed again by the second fixing device 26, it is possible to increase the gloss (glossiness) of an image.

In the description of the present exemplary embodiment, the phrase "the fixing process is not performed" means a case where no electric power is supplied to the heating source of the fixing devices (the first fixing device 16 and the second fixing device 26), and for example, a case where the fixing device transports the sheet by rotating the heating member or the pressurizing member without supplying electric power to the heating source is also included in the case where "the fixing process is not performed."

Next, an operation in a case where no ordinary color image is formed by the first image forming unit 100 (the first image forming part 10) and only a spot color image is formed on one surface of the sheet by the second image forming unit 200 (the second image forming part 20) will be described.

In the first image forming unit 100, the sheet is transported along the first sheet transport path R1 from the sheet supply part 31, and is delivered to the second image forming unit 200 through the sheet delivery path R3. At this time, for example, the sheet may be transported by rotating the secondary transfer roller 14 of the first image forming unit 100 or the heating member or the pressurizing member of the first fixing device 16.

In the second image forming part 20 of the second image forming unit 200, an image forming operation is performed as in the above-described example, so that a spot color toner image is transferred to one surface of the sheet from the lower side in the gravitational direction in the transfer portion Tb. Thereafter, the sheet, to which the spot color toner image is transferred, is transported to the second fixing device 26, and is subjected to a fixing process using heat and pressure by the second fixing device 26 so that the image is fixed on the sheet.

Then, the sheet, on which the spot color toner image is fixed, is transported along the second sheet transport path R4 in a state where the image formation surface faces downward in the gravitational direction, and is discharged to the sheet stacking part 33. In this manner, an image forming process is repeatedly executed for the number of cycles corresponding to the number of prints.

In addition, in the image forming apparatus 1 of the present exemplary embodiment, when only a spot color image is formed on the sheet by the second image forming unit 200 (the second image forming part), the sheet may be preheated by the first fixing device 16 of the first image forming unit 100 before being transported to the second image forming unit 200. This may make it possible to raise the temperature of the sheet transported to the second image forming unit 200, as compared with a case where the sheet is not preheated by the first fixing device 16, thereby improving the fixing characteristics of the spot color toner image, formed by the second image forming unit 200, on the sheet.

Second Exemplary Embodiment

Figure 4:
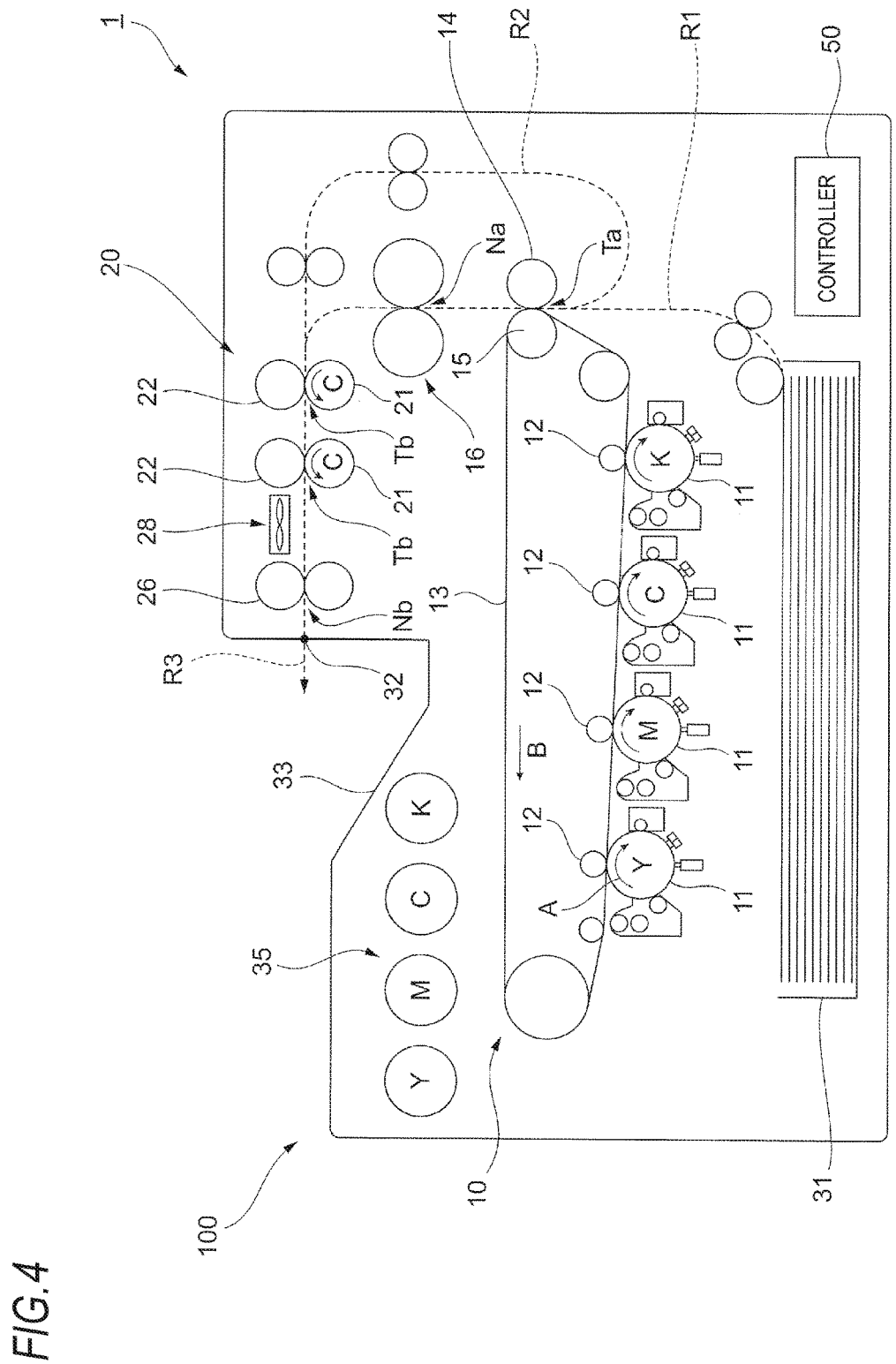
FIG. 4 is a view illustrating an overall configuration of an image forming apparatus according to a second exemplary embodiment.

Next, a second exemplary embodiment of the present invention will be described. In addition, the same reference numerals will be used for the same components as those in the first exemplary embodiment, and a detailed description thereof will be omitted here. FIG. 4 is a view illustrating an overall configuration of the image forming apparatus 1 according to a second exemplary embodiment.

In the image forming apparatus 1 of the first exemplary embodiment, the second image forming part 20 that forms a spot color image is provided in the second image forming unit 200, which is detachable from the first image forming unit 100 having the first image forming part 10. On the other hand, in the image forming apparatus 1 of the second exemplary embodiment, both the first image forming part 10 and the second image forming part 20 are disposed in a common case of the image forming apparatus 1.

Specifically, similarly to the first image forming unit 100 of the first exemplary embodiment, the image forming apparatus 1 of the second exemplary embodiment is provided with the first sheet transport path R1 that transports a sheet from the sheet supply part 31 toward the sheet discharge part 32 through the first image forming part 10 and with the sheet inverting path R2 that transports the inverted sheet, to the first image forming part 10.

Then, in the image forming apparatus 1 of the second exemplary embodiment, the second image forming part 20 is disposed between the first image forming part 10 and the sheet discharge part 32 in the sheet transport direction in the first sheet transport path R1. In other words, in the image forming apparatus 1 of the second exemplary embodiment, the first image forming part 10 and the second image forming part 20 share the sheet transport path to the sheet stacking part 33 and the sheet discharge part 32.

Therefore, in the image forming apparatus 1 of the second exemplary embodiment, a configuration of the image forming apparatus 1 may be simplified as compared with a case where the first image forming part 10 and the second image forming part 20 do not share the sheet transport path after an image is formed and the sheet discharge part 32 as in the first exemplary embodiment.

In addition, in the image forming apparatus 1 of the second exemplary embodiment, it is possible to reduce the dimension in the gravitational direction of the image forming apparatus 1 since it is not necessary to provide the sheet delivery path R3 (see FIG. 1) that extends in the gravitational direction for delivering a sheet from the first image forming unit 100 (see FIG. 1) to the second image forming unit 200. In addition, in the image forming apparatus 1 of the second exemplary embodiment, since it is not necessary to provide the sheet delivery path R3, it is possible to shorten the sheet transport path in a case where an ordinary color image and a spot color image are formed on a sheet, which may improve the productivity of an image forming operation.

In addition, the second image forming part 20 of the second exemplary embodiment forms images of two different spot colors (a first spot color and a second spot color) on the sheet transported from the first image forming unit 100. As illustrated in FIG. 4, the second image forming part 20 includes two photoreceptor drums 21 which correspond to the first spot color and the second spot color and which are disposed in parallel in the horizontal direction, and two transfer rollers 22 disposed so as to correspond to the respective photoconductor drums 21. In addition, the second image forming part 20 includes the second fixing device 26 that fixes the spot color images on the sheet, and the guide part 28 as an exemplary leading part that guides the sheet, onto which the toner images are transferred in the transfer portion Tb and which are transported toward the second fixing device 26.

The guide part 28 of the second exemplary embodiment guides the sheet upward in the gravitational direction by an airflow. The guide part 28 is configured with, for example, a suction fan that suctions a sheet by an airflow directed upward in the gravitational direction. In addition, the guide part 28 that guides the sheet by the airflow is not limited to the suction fan, and for example, may be configured to float the sheet upward in the gravitational direction from, for example, a guide by a blowing fan that blows air upward in the gravitational direction.

Then, by guiding the sheet upward in the gravitational direction by the airflow, the guide part 28 prevents the image formation surface of the sheet from coming into contact with, for example, the guide provided below the second sheet transport path R4 (the downstream portion R4b) in the gravitational direction.

Here, in the image forming apparatus 1 according to the second exemplary embodiment, when only an ordinary color image is formed on the sheet by the first image forming part 10 and no spot color image is formed by the second image forming part 20, at least one of the photoconductor drum 21, the transfer roller 22, or the heating member or the pressurizing member of the second fixing device 26 of the second image forming part 20 may be rotated. With this rotation, these also function as a transport member that transports the sheet along the first sheet transport path R1.

In addition, as described in the first exemplary embodiment, when it is necessary to apply a greater amount of heat to the sheet, such as, for example, when forming an image on a sheet having a large basis weight or when forming a highly gloss image, a fixing process may be performed again using heat and pressure in the second fixing device 26 of the second image forming part 20.

Third Exemplary Embodiment

Figure 5:
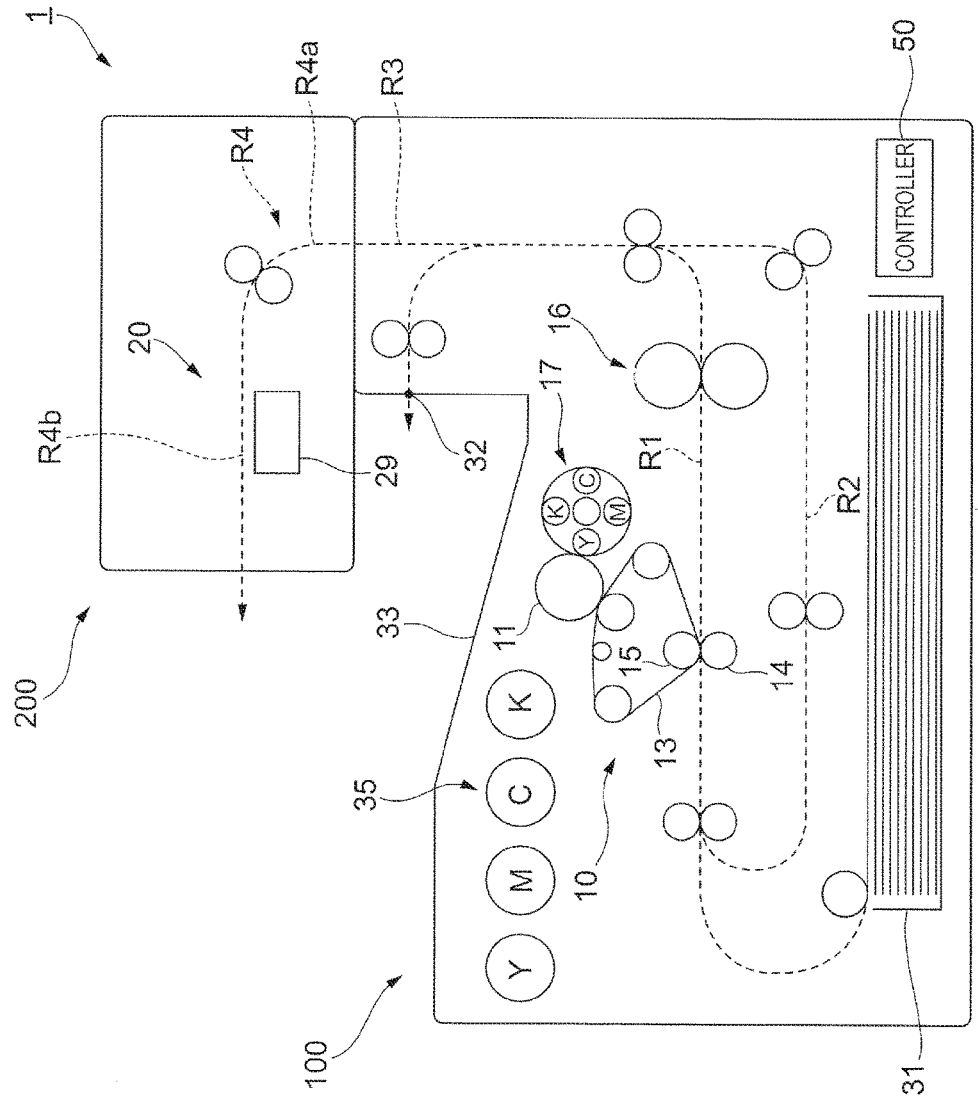
FIG. 5 is a view illustrating an overall configuration of an image forming apparatus according to a third exemplary embodiment.

Next, a third exemplary embodiment of the present invention will be described. In addition, the same reference numerals will be used for the same components as those in the first exemplary embodiment, and a detailed description thereof will be omitted here. FIG. 5 is a view illustrating an overall configuration of the image forming apparatus 1 according to a third exemplary embodiment.

Similarly to the first exemplary embodiment, the image forming apparatus 1 of the third exemplary embodiment includes the first image forming unit 100 that forms an ordinary color image on a sheet and a second image forming unit 200 that is disposed at the upper side of the first image forming unit 100 in the gravitational direction to form a spot color image on the sheet transported from the first image forming unit 100.

The first image forming unit 100 is a so-called rotary type color printer. The first image forming part 10 of the first image forming unit 100 includes the photoconductor drum 11, a rotary type developing device 17, the intermediate transfer belt 13 onto which a toner image formed on the photoconductor drum 11 is transferred, the secondary transfer roller 14 that secondarily transfers the toner image, primarily transferred onto the intermediate transfer belt 13, onto a sheet, and the backup roller 15 disposed to face the secondary transfer roller 14 with the intermediate transfer belt 13 interposed therebetween. In addition, the first image forming part 10 also includes the first fixing device 16 that fixes the secondarily transferred toner image on the sheet.

In addition, as illustrated in FIG. 5, in the first image forming unit 100 of the third exemplary embodiment, the first sheet transport path R1 is formed in an S-shaped form to transport the sheet from the sheet supply part 31 to the sheet stacking part 33 through the first image forming part 10.

Then, in the first image forming unit 100 of the third exemplary embodiment, the first fixing device 16 is horizontally juxtaposed to the secondary transfer portion Ta, which is formed between the secondary transfer roller 14 and the backup roller 15. This makes it possible to reduce the dimension of the first image forming unit 100 in the gravitational direction, for example, as compared with a case where the first fixing device 16 is disposed at the upper side of the secondary transfer portion Ta in the gravitational direction.

In addition, in the third exemplary embodiment, instead of the photoconductor drum 21 (see FIG. 1), the transfer roller 22 (see FIG. 1) and the second fixing device 26 (see FIG. 1) of the first exemplary embodiment, the second image forming part 20 includes an inkjet head 29 that forms a spot color image on a sheet by a so-called inkjet method. In the present exemplary embodiment, the inkjet head 29 forms an image, from the lower side in the gravitational direction, on the sheet which is transported along the first sheet transport path R1 with the image formation surface facing downward in the gravitational direction. In other words, the ink discharge direction by the inkjet head 29 has at least a component that faces upward in the gravitational direction.

Here, when an image is formed on the sheet by an inkjet method using the inkjet head 29, unlike an electrophotographic method, the second image forming part 20 does not require a fixing process on the sheet. Here, the phrase "does not require a fixing process on the sheet" means that no electric power is required in order to fix the image on the sheet, and more specifically, means that it is not necessary to supply electric power to a heating source of the second fixing device 26 (see FIG. 1), for example.

In the present exemplary embodiment, when the second image forming part 20 adopts an image forming method that does not require a fixing process, scattering of an image is prevented even if the image formation surface of the sheet, on which a spot color image is formed by the second image forming part 20, comes into contact with, for example, the guide provided adjacent to the first sheet transport path R1. In addition, since it is unnecessary to provide the second fixing device 26 or the guide part 28 (see FIG. 1) that guides the sheet in a manner such that the image formation surface of the sheet does not come into contact with the guide, for example, a configuration of the image forming apparatus 1 may be simplified, and it is possible to prevent an increase in the dimension of the image forming apparatus 1.

As described above, when the image forming apparatus 1 according to the first to third exemplary embodiments includes the first image forming part 10 and the second image forming part 20 provided at the upper side of the first image forming part 10 in the gravitational direction, the second image forming part 20 forms an image from the lower side in the gravitational direction on the sheet, which is transported with the image formation surface facing downward in the gravitational direction. This makes it possible to reduce the dimension of the image forming apparatus 1 in the gravitational direction, for example, as compared with a case where an image is formed from the horizontal direction in the second image forming part 20.

Fourth Exemplary Embodiment

Figure 6:
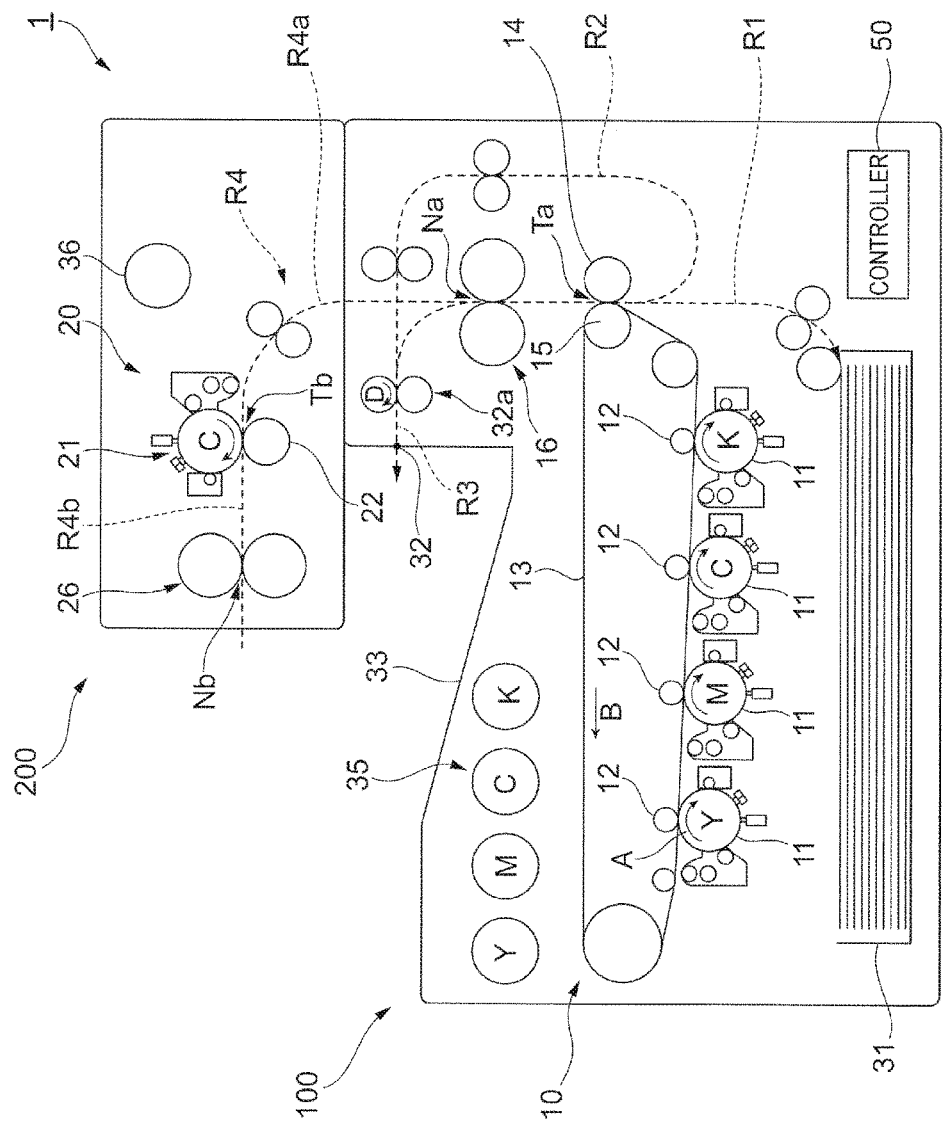
FIG. 6 is a view illustrating an overall configuration of an image forming apparatus according to a fourth exemplary embodiment.

Next, a fourth exemplary embodiment of the present invention will be described. In addition, the same reference numerals will be used for the same components as those in the first exemplary embodiment, and a detailed description thereof will be omitted here. FIG. 6 is a view illustrating an overall configuration of the image forming apparatus 1 according to a fourth exemplary embodiment.

The sheet discharge part 32 is provided with a discharge roller 32a, which sends a sheet to the sheet stacking part 33 by rotating in a first predetermined direction (the direction of the arrow D in FIG. 6) and also sends the sheet to the sheet inverting path R2 to be described later by rotating in a second direction opposite to the first direction (the direction opposite to the arrow D in FIG. 6).

In addition, although details will be described later, when forming an ordinary color image and a spot color image on one surface of a sheet so as to overlap each other, the image forming apparatus 1 of the present exemplary embodiment inverts the sheet, on which an ordinary color image is formed on one surface thereof in the first image forming unit 100, by the sheet inverting path R2, and thereafter transports the sheet to the second image forming unit 200 via the sheet delivery path R3. In addition, in the present exemplary embodiment, an inverting part is configured with the sheet inverting path R2 and the discharge roller 32a.

The first image forming part 10 includes the four photoconductor drums 11 disposed in parallel in the horizontal direction so as to correspond to respective colors, such as yellow, magenta, cyan, and black, the four primary transfer rollers 12 disposed so as to correspond to the respective photoconductor drums 11, the intermediate transfer belt 13 onto which toner images formed on the respective photoconductor drums 11 are sequentially transferred, the secondary transfer roller 14 as an exemplary toner image forming part or first toner image forming part that secondarily transfers the toner images, which are primarily transferred onto the intermediate transfer belt 13, onto a sheet, and the backup roller 15 disposed so as to face the secondary transfer roller 14 with the intermediate transfer belt 13 interposed therebetween.

In addition, the first image forming part 10 includes the first fixing device 16 as an exemplary fixing part or first fixing part that fixes the secondarily transferred toner images on the sheet.

In addition, in the present exemplary embodiment, an image holding part is configured with the intermediate transfer belt 13 and the backup roller 15, and an image transfer part is configured with the secondary transfer roller 14.

As will be described in detail later, the first fixing device 16 of the present exemplary embodiment is capable of changing fixing strength based on the control of the controller 50. Here, the fixing strength is the magnitude of heat or pressure supplied to the sheet on which the toner image is formed. For example, the first fixing device 16 may change the fixing strength by changing, for example, a heating temperature by the heating source of the heating member, a pressure between the heating member and the pressurizing member in the pressurizing portion Na, the length of the pressurizing portion Na in the transport direction, and the transport speed of the sheet that passes through the pressurizing portion Na.

The second image forming unit 200 includes the second image forming part 20 that forms an image from the upper side in the gravitational direction according to image data on the sheet transported from the first image forming unit 100.

In the second image forming unit 200 of the present exemplary embodiment, the second image forming part 20 is provided in the downstream portion R4*b* of the second sheet transport path R4. In the downstream portion R4*b* of the second sheet transport path R4, the sheet is transported in a manner such that the image formation surface, on which an image is formed by the second image forming part 20, faces upward in the gravitational direction. Then, the second image forming part 20 forms an image on the sheet from the upper side in the gravitational direction.

In the present exemplary embodiment, since the second image forming part 20 is configured to form an image from the upper side in the gravitational direction in the downstream portion R4*b* of the second sheet transport path R4, for example, as compared with a case where the second image forming part 20 forms an image from the horizontal direction in the upstream portion R4*a*, it is possible to shorten the length of the upstream portion R4*a* that extends in the gravitational direction. This makes it possible to reduce the dimension in the gravitational direction of the second image forming unit 200 and the entire image forming apparatus 1, as compared with a case where the second image forming part 20 forms an image from the horizontal direction in the upstream portion R4*a*.

When the second image forming part 20 is configured to form an image from the upper side in the gravitational direction, as compared with a case where the second image forming part 20 forms an image from the horizontal direction, the dimension in the horizontal direction of the second image forming unit 200 may be increased. However, since the number of constituent members of the second image forming unit 200 is less than that of the first image forming unit 100, the dimension in the horizontal direction of the second image forming unit 200 is less likely to be larger than that of the first image forming unit 100. Therefore, even when the second image forming part 20 is configured to form an image from the upper side in the gravitational direction, an increase in the dimension in the horizontal direction of the entire image forming apparatus 1 is prevented.

As described above, in the second image forming part 20, the sheet is transported in a manner such that the image formation surface thereof faces upward in the gravitational direction in the transfer portion Tb. Then, the second image forming part 20 forms an image on the sheet transported from the first image forming unit 100, from the upper side in the gravitational direction in the transfer portion Tb.

Figure 7A:
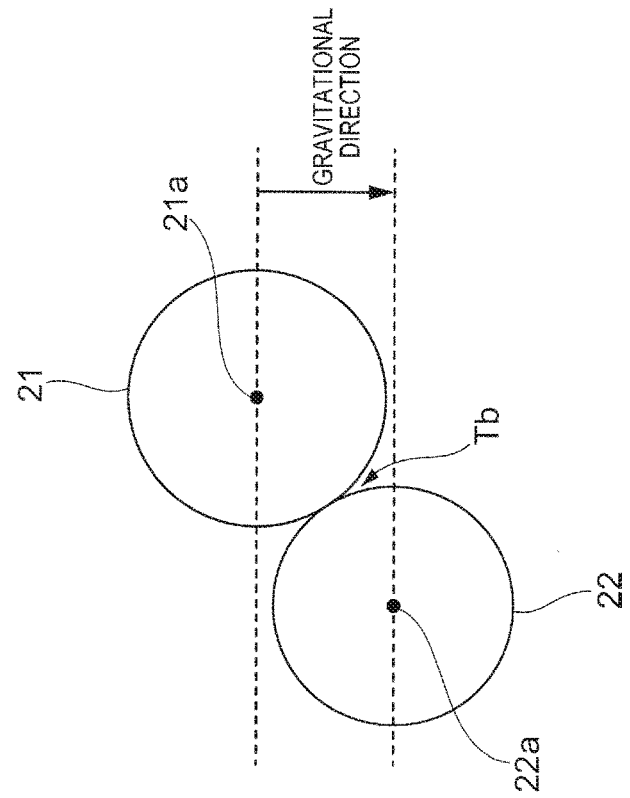
FIGS. 7A and 7B are views for explaining an arrangement of a photoconductor drum and a transfer roller in a second image forming part.
Figure 7B:
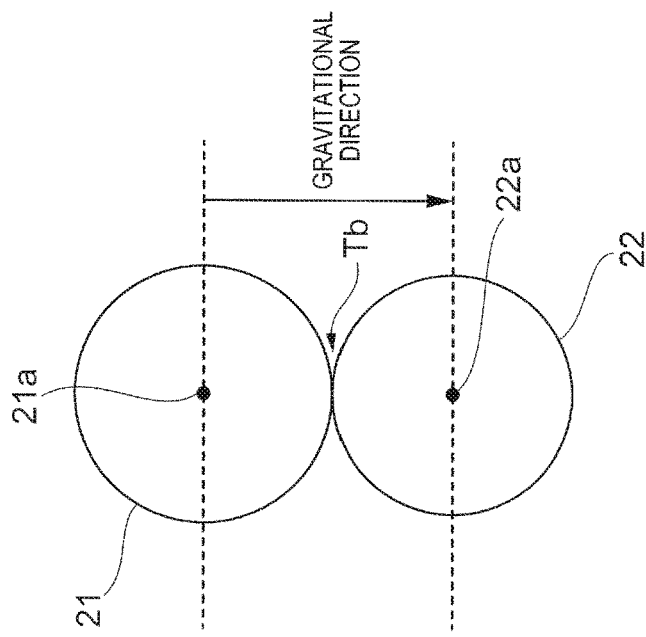

FIGS. 7A and 7B are views for explaining an arrangement of the photoconductor drum 21 and the transfer roller 22 in the second image forming part 20, and illustrate an exemplary arrangement of the photoconductor drum 21 and the transfer roller 22.

In a case where the transfer portion Tb is formed by the photoconductor drum 21 and the transfer roller 22, which rotate, as in the present exemplary embodiment, the phrase "forming an image from the upper side in the gravitational direction in the transfer portion Tb" means that the photoconductor drum 21 that holds the toner image is disposed at the upper side of the transfer roller 22 in the gravitational direction. More specifically, this means that the rotation center 21*a* of the photoconductor drum 21 is located at the upper side of the rotation center 22*a* of the transfer roller 22 in the gravitational direction.

Thus, a case where an image is formed from the upper side in the gravitational direction in the transfer portion Tb includes, for example, a mode in which the entire photoconductor drum 21 is located higher than the transfer roller 22 in the gravitational direction as illustrated in FIG. 7A, and a mode in which positions of the photoconductor drum 21 and the transfer roller 22 in the gravitational direction partially overlap each other as illustrated in FIG. 7B.

In addition, in the present exemplary embodiment, the phrase "the image formation surface of the sheet faces upward in the gravitational direction" means that the direction in which the image formation surface faces in the transfer portion Tb (perpendicular to the image formation surface in the transfer portion Tb) has at least an upward component of the gravitational direction.

Returning to FIG. 6, in the second image forming part 20 of the present exemplary embodiment, similarly to an example illustrated in FIG. 7A, the entire photoconductor drum 21 is located higher than the transfer roller 22 in the gravitational direction.

In addition, the second image forming unit 200 does not include a stacking part on which sheets are stacked. As will be described in detail later, the sheet, on which a spot color image is formed by the second image forming part 20, is transported along the downstream portion R4*b* of the second sheet transport path R4 and is stacked on the sheet stacking part 33 provided in the first image forming unit 100. This makes it possible to simplify a configuration of the image forming apparatus 1, as compared with a case where, for example, a stacking part on which sheets are stacked is provided in each of the first image forming unit 100 and the second image forming unit 200.

Next, an image forming operation performed by the image forming apparatus 1 of the present exemplary embodiment will be described. The image forming operation described below is executed based on the control of the controller 50.

First, an operation of the image forming apparatus 1 in a case where an ordinary color image is formed on one surface of the sheet by the first image forming unit 100 (the first image forming part 10), and thereafter, a spot color image is formed and superimposed by the second image forming unit 200 (the second image forming part 20) on the one surface of the sheet, on which the ordinary color image is formed, will be described.

In the image forming apparatus 1, image data received from, for example, a PC (not illustrated) is subjected to image processing by the controller 50, and is supplied to the first image forming part 10 of the first image forming unit 100 and to the second image forming part 20 of the second image forming unit 200.

In the first image forming part 10 of the first image forming unit 100, the respective photoconductor drums 11, which correspond to respective ordinary colors, are charged to a predetermined potential by the charging device while rotating in the direction of the arrow A, and are exposed by the exposure device, which emits light based on the image data supplied from the controller 50. Therefore, electrostatic latent images regarding respective color images are formed on the respective photoconductor drums 11. Then, the electrostatic latent images formed on the photoconductor drums 11 are developed by the developing device, whereby respective yellow, magenta, cyan, and black toner images are formed on the respective photoconductor drums 11.

The respective color toner images formed on the respective photoconductor drums 11 are multi-transferred using the respective primary transfer rollers 12 to the intermediate transfer belt 13, which moves in the direction of the arrow B.

In addition, in accordance with a timing at which the toner images multi-transferred to the intermediate transfer belt 13 reach the secondary transfer roller 14, the sheet is transported from the sheet supply part 31 to the secondary transfer portion Ta through the first sheet transport path R1. Then, the ordinary color toner images on the intermediate transfer belt 13 are collectively transferred onto one surface of the sheet by the secondary transfer roller 14 in the secondary transfer portion Ta.

Thereafter, the sheet, onto which the ordinary color toner images are formed, is separated from the intermediate transfer belt 13, and is transported upward in the gravitational direction along the first sheet transport path R1 so as to reach the first fixing device 16. The ordinary color toner images on the sheet transported to the first fixing device 16 are subjected to a fixing process using heat and pressure by the first fixing device 16 so as to be fixed on the sheet.

Then, the sheet on which the ordinary color toner images are fixed are transported along the first sheet transport path R1 so as to reach the sheet discharge part 32. In the sheet discharge part 32, a portion of the sheet is discharged from the sheet discharge part 32 toward the sheet stacking part 33 as the discharge roller 32a rotates in the first direction (the direction of the arrow D). Thereafter, the sheet is sent to the sheet inverting path R2 as the discharge roller 32a subsequently rotates in the second direction (the direction opposite to the arrow D).

Then, as the sheet is transported along the sheet inverting path R2, the sheet is inverted so that the sheet again passes through the secondary transfer portion Ta and the pressurizing portion Na of the first image forming part 10 with the image formation surface facing the right side in the drawing). The sheet that has passed through the secondary transfer portion Ta and the pressurizing portion Na is transported upward in the gravitational direction so as to be delivered to the second image forming unit 200 via the sheet delivery path R3.

In the second image forming unit 200, the sheet delivered from the first image forming unit 100 is transported along the second sheet transport path R4. Specifically, the sheet is transported upward in the gravitational direction along the upstream portion R4a of the second sheet transport path R4 with the image formation surface, on which the ordinary color toner images are formed, facing the right side in the drawing. Subsequently, the sheet changes the traveling direction thereof along the downstream portion R4b of the second sheet transport path R4 so as to be transported to the left side in the drawing in the horizontal direction with the image formation surface facing upward in the gravitational direction, thereby reaching the transfer portion Tb.

In addition, in the second image forming part 20 of the second image forming unit 200, the photoconductor drum 21 is charged to a predetermined potential by the charging device while rotating in the direction of the arrow C, and is exposed by the exposure device, which emits light based on the image data supplied from the controller 50. Therefore, an electrostatic latent image regarding a spot color image is formed on the photoconductor drum 21. Then, the electrostatic latent image formed on the photoconductor drum 21 is developed by the developing device, whereby a spot color toner image is formed on the photoconductor drum 21.

Then, the spot color toner image formed on the photoconductor drum 21 is electrostatically transferred to the image formation surface, which faces upward in the gravitational direction, of the sheet transported to the transfer portion Tb, from the upper side in the gravitational direction by the transfer roller 22.

Thereafter, the sheet to which the spot color toner image is transferred is peeled off from the surface of the photoconductor drum 21, and is transported to the second fixing device 26 along the downstream portion R4b of the second sheet transport path R4 with the image formation surface facing upward in the gravitational direction.

As described above, in the second image forming unit 200 of the present exemplary embodiment, in the second sheet transport path R4 (the downstream portion R4b) between the transfer portion Tb and the pressurizing portion Nb of the second fixing device 26, the sheet is transported with the image formation surface facing upward in the gravitational direction. Therefore, unlike a case where, for example, the sheet is transported with the image formation surface facing downward in the gravitational direction, an unfixed toner image transferred to the sheet in the transfer portion Tb is prevented from coming into contact with, for example, the guide provided at the lower side of the second sheet transport path R4 (the downstream portion R4b) in the gravitational direction. Then, for example, scattering of an image or contamination of the sheet due to contact between the unfixed toner image and the guide is prevented.

The toner images on the sheet transported to the second fixing device 26 are subjected to a fixing process using heat and pressure by the second fixing device 26 so as to be fixed on the sheet. Then, the sheet on which the fixed ordinary color and spot color images are formed is transported along the second sheet transport path R4 in a state where the image formation surface faces upward in the gravitational direction, and is discharged to the sheet stacking part 33 provided in the first image forming unit 100.

In this manner, an image forming process is repeatedly executed for the number of cycles corresponding to the number of prints.

When forming a superimposed image of an ordinary color image and a spot color image on one surface of the sheet as described above, both the first fixing device 16 of the first image forming unit 100 and the second fixing device 26 of the second image forming unit 200 perform a fixing process. The first fixing device 16 or the second fixing device 26 requires electric power in order to generate heat required for the fixing process. Then, in a case where the peaks in the first fixing device 16 and the second fixing device 26, at which the electric power that generates heat required for the fixing process becomes large, overlap each other, the power burden of the image forming apparatus 1 tends to be large. Therefore, in the present exemplary embodiment, the peak of electric power that generates heat in the first fixing device 16 and the peak of t electric power that generates heat in the second fixing device 26 may be shifted based on the control of the controller 50.

Here, as described above, in the image forming apparatus 1 of the present exemplary embodiment, when forming the ordinary color image and the spot color image on one surface of the sheet so as to overlap each other, the sheet, on which the ordinary color toner image is fixed in the first image forming part 10 and which is inverted by the sheet inverting path R2, again passes through the secondary transfer portion Ta and the pressurizing portion Na of the first image forming part 10.

When the inverted sheet again passes through the secondary transfer portion Ta, the absolute value of a transfer voltage, applied to the secondary transfer portion Ta by the power supply, may be lowered based on the control of the controller 50. In other words, the absolute value of the transfer voltage, applied to the secondary transfer portion Ta when the inverted sheet again passes through the secondary transfer portion Ta, may be lower than the absolute value of the transfer voltage applied to the secondary transfer portion Ta when the ordinary color toner image is transferred to the sheet.

In a case where the absolute value of the transfer voltage, applied to the secondary transfer portion Ta when the inverted sheet again passes through the secondary transfer portion Ta, is equal to or greater than the absolute value of the transfer voltage applied to the transfer portion Ta when the ordinary color toner image is transferred to the sheet, the paper is likely to be charged when passing through the secondary transfer portion Ta. In this case, discharge tends to occur via the sheet, for example, when the sheet is peeled off from the intermediate transfer belt 13, and a change in the behavior of the sheet may occur due to this discharge.

On the other hand, by lowering the absolute value of the transfer voltage applied to the secondary transfer portion Ta when the inverted sheet again passes through the secondary transfer portion Ta, it is possible to prevent a change in the behavior of the sheet due to discharge, for example.

Further, no transfer voltage may be applied to the secondary transfer portion Ta when the inverted sheet again passes through the secondary transfer portion Ta. This makes it possible to further prevent a change in the behavior of the sheet due to discharge. In addition, when no transfer voltage is applied to the secondary transfer portion Ta, the sheet may be transported by rotating the secondary transfer roller 14 or the intermediate transfer belt 13, for example.

In addition, when the inverted sheet again passes through the pressurizing portion Na, the fixing strength on the sheet by the first fixing device 16 may be lowered based on the control of the controller 50. In other words, the heat or pressure, applied to the sheet by the first fixing device 16 when the inverted sheet again passes through the pressurizing portion Na, may be smaller than the heat or pressure applied to the sheet by the first fixing device 16 when the ordinary color toner image is fixed on the sheet.

As a method of lowering the fixing strength to the sheet by the first fixing device 16, for example, a heating temperature by the heating source of the heating member may be lowered, a pressure between the heating member and the pressurizing member in the pressurizing portion Na may be reduced, the length of the pressurizing portion Na in the transport direction may be shortened, or the transport speed of the sheet that passes through the pressurizing portion Na may be increased.

By lowering the fixing strength on the sheet by the first fixing device 16 when the inverted sheet again passes through the pressurizing portion Na, it is possible to prevent variation in the image caused when the ordinary color image is again heated or pressurized after being fixed on the sheet. Such variation in the image may be, for example, an increase in the gloss (glossiness) of the ordinary color image after the image is fixed on the sheet.

Further, from the viewpoint of preventing variation in the image caused by heating or pressurizing the ordinary color image after the image is fixed on the sheet, no fixing process may be performed by the first fixing device 16 when the inverted sheet again passes through the pressurizing portion Na.

In the description of the present exemplary embodiment, the phrase "the fixing process is not performed" means a case where no electric power is supplied to the heating source of the fixing devices (the first fixing device 16 and the second fixing device 26), and for example, a case where the fixing device transports the sheet by rotating the heating member or the pressurizing member without supplying electric power to the heating source is also included in the case where "the fixing process is not performed."

On the other hand, when it is necessary to apply a greater amount of heat to the sheet, when the inverted sheet again passes through the pressurizing portion Na, electric power may be supplied to the heating source of the first fixing device 16 so as to again apply heat to the sheet based on the control of the controller 50.

A case where it is necessary to apply a greater amount of heat to the sheet may be, for example, a case where it is desired to increase the gloss (glossiness) of the spot color image formed in the second image forming part 20 or a case where the basis weight of the sheet is large.

By applying heat to the sheet by the first fixing device 16 when the inverted sheet again pass through the pressurizing portion Na, as compared with a case where heat is not applied by the first fixing device 16, it is possible to increase the temperature of the sheet transported to the second image forming unit 200. Therefore, it is possible to increase the gloss (glossiness) of the spot color image formed in the second image forming part 20 of the second image forming unit 200. In addition, even when the basis weight of the sheet is large, it is possible to prevent the occurrence of a fixing failure in the spot color image formed in the second image forming part 20 of the second image forming unit 200.

Next, an operation in a case where only an ordinary color image is formed on one surface of the sheet by the first image forming unit 100 (the first image forming part 10) and no spot color image is formed by the second image forming unit 200 (the second image forming part 20) will be described.

In the first image forming part 10 of the first image forming unit 100, an image forming operation is performed as in the above-described example, and ordinary color toner images are collectively transferred onto one surface of the sheet in the secondary transfer portion Ta. Thereafter, the sheet, onto which the ordinary color toner images are transferred, is transported to the first fixing device 16, and is subjected to a fixing process using heat and pressure by the first fixing device 16 so that the images are fixed on the sheet.

Then, the sheet, on which the ordinary color toner images are fixed, is transported along the first sheet transport path R1, and is discharged to the sheet stacking part 33 via the sheet discharge part 32 in a state where the image formation surface faces downward in the gravitational direction. In this manner, an image forming process is repeatedly executed for the number of cycles corresponding to the number of prints.

In the image forming apparatus 1 according to the present exemplary embodiment, when forming only an ordinary color image on a sheet without forming a spot color image, the sheet is discharged directly to the sheet stacking part 33 without passing through the sheet inverting path R2. Therefore, as compared with a case of discharging a sheet through the sheet inverting path R2, it is possible to shorten a sheet transport path, which may improve productivity.

Meanwhile, as described above, depending on the type of sheet or the image density, for example, the fixing characteristics of the toner image on the sheet may be different. When an image is formed on a sheet having a large basis weight or when the image density is high, the fixing characteristics of the toner image on the sheet tends to be low. In such a case, a greater amount of heat and pressure may be applied to the sheet in order to enhance the fixing characteristics of the toner image on the paper. In addition, in the case of increasing the gloss (glossiness) of an image formed on the sheet, a greater amount of heat and pressure may be applied to the sheet.

In the image forming apparatus 1 according to the present exemplary embodiment, when it is necessary to apply a greater amount of heat to the sheet, based on the control of the controller 50, the sheet, on which the fixing process is performed by the first fixing device 16, is transported to the second image forming unit 200. Then, a fixing process using heat and pressure is again performed by the second fixing device 26 of the second image forming unit 200. Therefore, even when an image is formed on a sheet having a large basis weight or even when the image density is high, for example, the occurrence of a fixing defect may be prevented as compared with a case where the fixing process is not performed again by the second fixing device 26. In addition, as compared with the case where the fixing process is not performed again by the second fixing device 26, it is possible to increase the gloss (glossiness) of an image.

In a case where the sheet, subjected to the fixing process by the first fixing device 16, is transported to the second image forming unit 200, the sheet may be directly transported to the second image forming unit 200 without passing through the sheet inverting path R2, or may be transported to the second image forming unit 200 after the sheet is inverted by the sheet inverting path R2.

In a case where the sheet is transported directly to the second image forming unit 200 without passing through the sheet inverting path R2, a compared with a case where the sheet is transported through the sheet inverting path R2, it is possible to shorten the transport path of the sheet, and to enhance productivity. In addition, in this case, in the second sheet transport path R4 (the downstream portion R4b) of the second image forming unit 200, the sheet is transported with the image formation surface, on which the ordinary color image is formed, faces downward in the gravitational direction. However, since the fixing process is performed on the ordinary color image in the first fixing device 16 of the first image forming unit 100, a problem such as, for example, rubbing of the image, hardly occurs.

On the other hand, in a case where the sheet is transported to the second image forming unit 200 after the sheet is inverted in the sheet inverting path R2, the sheet is transported with the image formation surface, on which the ordinary color image is formed, facing upward in the gravitational direction in the second fixing device 26 of the second image forming unit 200. In this case, heat is more easily transmitted to the image formation surface of the sheet by the second fixing device 26. This makes it possible to further prevent the occurrence of a fixing failure or to further enhance the gloss (glossiness) of the image.

In a case where the sheet is inverted by the sheet inverting path R2, the sheet passes through the pressurizing portion Na of the first image forming unit 100 before being transported to the second image forming unit 200. In this case, electric power may be supplied to the heating source of the first fixing device 16 so as to perform a fixing process on the sheet before the sheet is transported to the second image forming unit 200. Therefore, since the fixing process is performed on the sheet three times in total by performing the fixing process one time in the first fixing device 16 and the fixing process two times in the second fixing device 26, it is possible to apply a greater amount of heat to the sheet.

Next, an operation in a case where no ordinary color image is formed by the first image forming unit 100 (the first image forming part 10) and only a spot color image is formed on one surface of the sheet by the second image forming unit 200 (the second image forming part 20) will be described.

In the first image forming unit 100, the sheet is transported along the first sheet transport path R1 from the sheet supply part 31, and is delivered to the second image forming unit 200 through the sheet delivery path R3. At this time, for example, the sheet may be transported by rotating the secondary transfer roller 14 of the first image forming unit 100 or the heating member or the pressurizing member of the first fixing device 16.

In the second image forming part 20 of the second image forming unit 200, an image forming operation is performed as in the above-described example, so that a spot color toner image is transferred to one surface of the sheet from the upper side in the gravitational direction in the transfer portion Tb. Thereafter, the sheet, to which the spot color toner image is transferred, is transported to the second fixing device 26, and is subjected to a fixing process using heat and pressure by the second fixing device 26 so that the image is fixed on the sheet.

Then, the sheet, on which the spot color toner image is fixed, is transported along the second sheet transport path R4 in a state where the image formation surface faces upward in the gravitational direction, and is discharged to the sheet stacking part 33. In this manner, an image forming process is repeatedly executed for the number of cycles corresponding to the number of prints.

In addition, in the image forming apparatus 1 of the present exemplary embodiment, when only a spot color image is formed on the sheet by the second image forming unit 200 (the second image forming part), the sheet may be preheated by the first fixing device 16 of the first image forming unit 100 before being transported to the second image forming unit 200. This may make it possible to raise the temperature of the sheet transported to the second image forming unit 200, as compared with a case where the sheet is not preheated by the first fixing device 16, thereby improving the fixing characteristics of the spot color toner image, formed by the second image forming unit 200, on the sheet.

Next, an operation in a case where an ordinary color image is formed on one surface of a sheet by the first image forming unit 100 (the first image forming part 10), and thereafter, a spot color image is formed on the other surface of the sheet by the second image forming unit 200 (the second image forming part 20) will be described.

In the first image forming part 10 of the first image forming unit 100, an image forming operation is performed as in the above-described example, and ordinary color toner images are collectively transferred onto one surface of the sheet in the secondary transfer portion Ta. Thereafter, the sheet, to which the ordinary color toner image is transferred, is transported to the first fixing device 16, and is subjected to a fixing process using heat and pressure by the first fixing device 16 so that the image is fixed on the one surface of the sheet.

The sheet, on the one surface of which the ordinary color image is fixed by the first fixing device 16, is transported to the second image forming unit 200 by passing through the sheet delivery path R3 without passing through the sheet inverting path R2, in other words, without inverting the sheet.

Then, in the second image forming unit 200, the sheet is transported to the second image forming part 20 in a state where the one surface, on which the ordinary color image is formed, faces downward in the gravitational direction and the other surface, on which no image is formed, faces upward in the gravitational direction.

In the second image forming part 20 of the second image forming unit 200, an image forming operation is performed as in the above-described example, so that a spot color toner image is transferred to the other surface of the sheet from the upper side in the gravitational direction in the transfer portion Tb. Thereafter, the sheet, to which the spot color toner image is transferred, is transported to the second fixing device 26, and is subjected to a fixing process using heat and pressure by the second fixing device 26 so that the image is fixed on the other surface of the sheet.

Then, the sheet, on which the spot color toner image is fixed, is transported along the second sheet transport path R4, and is discharged to the sheet stacking part 33. In this manner, an image forming process is repeatedly executed for the number of cycles corresponding to the number of prints.

Fifth Exemplary Embodiment

Figure 8:
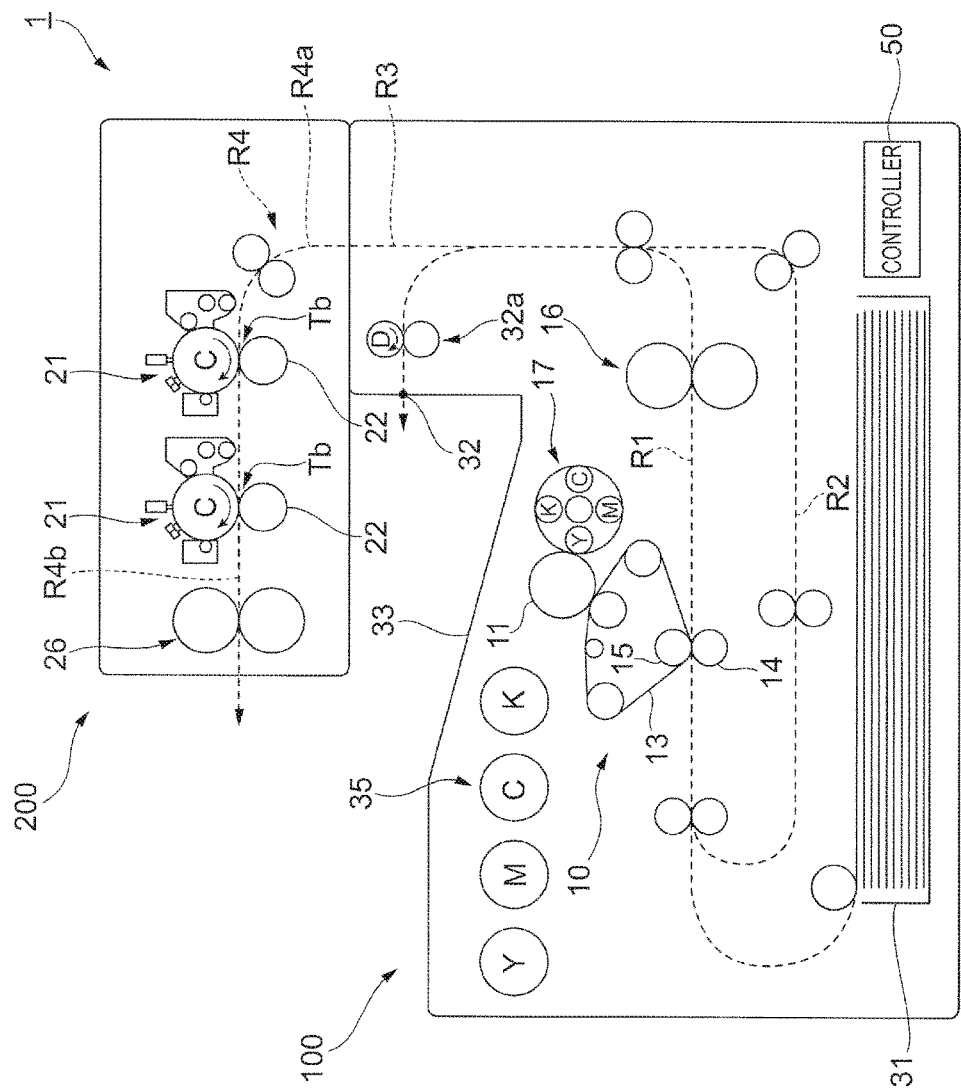
FIG. 8 is a view illustrating an overall configuration of an image forming apparatus according to a fifth exemplary embodiment.

Next, a fifth exemplary embodiment of the present invention will be described. The same reference numerals are used for the same configurations as those in the fourth exemplary embodiment, and a detailed description thereof will be omitted here. FIG. 8 is a view illustrating an overall configuration of the image forming apparatus 1 according to a fifth exemplary embodiment.

Similarly to the fourth exemplary embodiment, the image forming apparatus 1 of the fifth exemplary embodiment includes the first image forming unit 100 that forms an ordinary color image on a sheet, and a second image forming unit 200 that is stacked at the upper side of the first image forming unit 100 in the gravitational direction to form a spot color image on the sheet transported from the first image forming unit 100.

The first image forming unit 100 is a so-called rotary type color printer. The first image forming part 10 of the first image forming unit 100 includes the photoconductor drum 11, a rotary type developing device 17, the intermediate transfer belt 13 onto which a toner image formed on the photoconductor drum 11 is transferred, the secondary transfer roller 14 that secondarily transfers the toner image, primarily transferred onto the intermediate transfer belt 13, onto a sheet, and the backup roller 15 disposed to face the secondary transfer roller 14 with the intermediate transfer belt 13 interposed therebetween. In addition, the first image forming part 10 also includes the first fixing device 16 that fixes the secondarily transferred toner image on the sheet.

In addition, as illustrated in FIG. 8, similarly to the first image forming unit 100 of the fourth exemplary embodiment, the first image forming unit 100 of the fifth exemplary embodiment is provided with the first sheet transport path R1 that transports the sheet from the sheet supply part 31 toward the sheet discharge part 32 through the first image forming part 10, the sheet inverting path R2 that again transports the inverted sheet to the first image forming part 10, and the sheet delivery path R3 that delivers the sheet that has passed through the first image forming part 10 to the second image forming unit 200.

In the first image forming unit 100 of the fifth exemplary embodiment, the first sheet transport path R1 is formed in an S-shaped form.

Then, in the first image forming unit 100 of the fifth exemplary embodiment, the first fixing device 16 is horizontally juxtaposed to the secondary transfer portion Ta formed between the secondary transfer roller 14 and the backup roller 15. This makes it possible to reduce the dimension of the first image forming unit 100 in the gravitational direction, for example, as compared with a case where the first fixing device 16 is disposed at the upper side of the secondary transfer portion Ta in the gravitational direction.

The second image forming unit 200 forms spot color images of two different types (a first spot color and a second spot color) on the sheet transported from the first image forming unit 100. As illustrated in FIG. 8, the second image forming part 20 includes two photoconductor drums 21 disposed in parallel in the horizontal direction so as to correspond to the first spot color and the second spot color, and two transfer rollers 22 disposed so as to correspond to the respective photoconductor drums 21. In addition, the second image forming part 20 includes the second fixing device 26 that fixes the spot color images on the sheet.

In the image forming apparatus 1 of to the fifth exemplary embodiment, when forming an ordinary color image and a spot color image on one surface of a sheet, similarly to the fourth exemplary embodiment, the sheet, on the surface of which an ordinary color image is formed by the first image forming part 10 of the first image forming unit 100, is transported to the second image forming unit 200 after the sheet is inverted via the sheet inverting path R2. Then, in the second image forming unit 200, the second image forming part 20 forms a spot color image on the one surface of the sheet received from the first image forming unit 100 from the upper side in the gravitational direction.

As described above, in a case where the image forming apparatus 1 includes the first image forming part 10 and the second image forming part 20 provided at the upper side of the first image forming part 10 in the gravitational direction, an image is formed from the upper side in the gravitational direction on the sheet, transported with the image formation surface facing upward in the gravitational direction, by the second image forming part 20. This makes it possible to reduce the dimension of the image forming apparatus 1 in the gravitational direction, for example, as compared with a case where an image is formed from the horizontal direction in the second image forming part 20.

In addition, in the second image forming unit 200, by forming an image from the upper side in the gravitational direction on the sheet in the second image forming part 20, the image formation surface of the sheet does not droop downward in the gravitational direction in the second sheet transport path R4 (the downstream portion R4b) between the transfer portion Tb and the pressurizing portion Nb. Therefore, an unfixed toner image transferred to the sheet in the transfer portion Tb is prevented from coming into contact with, for example, the guide provided at the lower side of the second sheet transport path R4 (the downstream portion R4b) in the gravitational direction. Then, rubbing of an image or scattering of an image caused by contact between the unfixed toner image and the guide, for example, is prevented.

Further, in the image forming apparatus 1, the sheet, on the one surface of which an ordinary color image is formed by the first image forming part 10 of the first image forming unit 100, is transported to the second image forming unit 200 after the sheet is inverted via the sheet inverting path R2. Then, in the second image forming unit 200, the second image forming part 20 forms a spot color image on the one surface of the sheet received from the first image forming unit 100 from the upper side in the gravitational direction.

Therefore, even in a case of adopting a configuration in which an image is formed from the upper side in the gravitational direction in order to prevent rubbing of the image in the second image forming part 20, the first image forming part 10 and the second image forming part 20 may form the images on the same surface of the sheet. That is, in the image forming apparatus 1 having the above-described configuration, it is possible to form the ordinary color image and the spot color image on the same surface (one surface) of the sheet while preventing rubbing of the image in the second image forming part 20.

In the respective exemplary embodiments described above, an example in which images of ordinary colors, that is, yellow, magenta, cyan, and black are formed by the first image forming part 10 and a spot color image is formed by the second image forming part 20, but the present invention is not limited thereto. Each of the first image forming part 10 and the second image forming part 20 may form an ordinary color image, may form a spot color image, or may form an image of one color or plural colors selected from among the ordinary colors or the spot color.

In addition, an image forming method in the first image forming part 10 and the second image forming part 20 is not particularly limited. Each of the first image forming part 10 and the second image forming part 20 may be a tandem type image forming part, may be an image forming part having a rotary type developing device, or may be a direct transfer type image forming part that directly transfers an image from a photoconductor drum to a sheet without using an intermediate transfer belt. In addition, the first image forming part 10 and the second image forming part 20 may be image forming parts that form images by a method such as, for example, an inkjet method, other than an electrophotographic method. In addition, the image forming methods of the first image forming part 10 and the second image forming part 20 may be the same as each other, or may be different from each other.

Moreover, in a case of adopting an electrophotographic image forming part as the first image forming part 10 or the second image forming part 20, the fixing device that fixes the image on the sheet may adopt for example, a method such as, for example, flash fixing that performs a fixing process using light energy, other than a method that performs a fixing process using heat and pressure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a first image forming part that forms an image on one surface of a recording material; and
    a second image forming part provided at an upper side of the first image forming part in a gravitational direction, the second image forming part that transports the recording material received from the first image forming part such that the one surface faces downward in the gravitational direction and that forms an image on the one surface from a lower side in the gravitational direction.

2. The image forming apparatus according to claim 1, wherein
    the second image forming part includes
        a toner image forming part that forms a toner image on the one surface of the recording material from the lower side in the gravitational direction, and
        a fixing part that fixes, on the recording material, the toner image formed by the toner image forming part, and
    a transport path of the recording material from the toner image forming part to the fixing part is curved upward in the gravitational direction.

3. The image forming apparatus according to claim 2, wherein the second image forming part is configured such that a transport direction of the recording material in the toner image forming part is tilted upward in the gravitational direction relative to a horizontal direction.

4. The image forming apparatus according to claim 3, wherein the second image forming part is configured such that the transport direction of the recording material in the fixing part is tilted downward in the gravitational direction relative to the horizontal direction.

5. The image forming apparatus according to claim 2, further comprising:
    a guide part provided in the transport path of the recording material from the toner image forming part to the fixing part, the guide part that guides the recording material, which is transported upward in the gravitational direction, downward in the gravitational direction.

6. The image forming apparatus according to claim 5, wherein the guide part include a guide surface having a shape recessed upward in the gravitational direction and coming into contact with the other surface of the recording material to guide the recording material downward in the gravitational direction.

7. The image forming apparatus according to claim 1, wherein
    the second image forming part includes
        a toner image forming part that forms a toner image on the one surface of the recording material from the lower side in the gravitational direction,
        a fixing part that fixes, on the recording material, the toner image formed by the toner image forming part, and
        a leading part that leads the recording material upward in the gravitational direction by a flow of air in a transport path of the recording material from the toner image forming part to the fixing part.

8. The image forming apparatus according to claim 1, further comprising:
    a discharge part that discharges the recording material having the image formed by the first image forming part, wherein
    the second image forming part is provided between the first image forming part and the discharge part in a transport direction of the recording material, and
    the recording material on which the image is formed by the second image forming part is discharged via the discharge part.

9. The image forming apparatus according to claim 8, wherein
    the second image forming part includes
        a toner image forming part that forms a toner image on the one surface of the recording material from the lower side in the gravitational direction, and a fixing part that fixes, on the recording material, the toner image formed by the toner image forming part, and when forming no image on the recording material received from the first image forming part, the second image forming part transports the recording material to the discharge part using at least one of the toner image forming part or the fixing part.

10. The image forming apparatus according to claim 1, wherein the second image forming part does not require a fixing process when the image is formed on the one surface of the recording material.

11. The image forming apparatus according to claim 1, wherein
the first image forming part includes
a first toner image forming part that forms a toner image on the one surface of the recording material, and
a first fixing part that heats the toner image formed by the first toner image forming part and fixes the toner image on the recording material,
the second image forming part includes
a second toner image forming part that forms a toner image on the one surface of the recording material from the lower side in the gravitational direction, and
a second fixing part that heats the toner image formed by the second toner image forming part and fixes the toner image on the recording material, and
the second image forming part receives the recording material on which the image is formed by the first image forming part, and heats the recording material by the second fixing part.

12. An image forming unit comprising:
a transport part that receives a recording material transported upward in a gravitational direction from an image forming apparatus that forms an image on one surface of the recording material, and transports the recording material such that the one surface faces downward in the gravitational direction; and
an image forming part that forms an image on the one surface of the recording material transported by the transport part, from a lower side in the gravitational direction.

13. An image forming apparatus comprising:
a first image forming part that forms an image on one surface of a recording material;
an inverting part that inverts the recording material in which the image is formed on the one surface by the first image forming part, the inverting part that sends the inverted recording material to the first image forming part; and
a second image forming part provided at an upper side of the first image forming part in a gravitational direction, transports the recording material, which is inverted by the inverting part and which passes through the first image forming part, such that the one surface faces upward in the gravitational direction, and forms an image on the one surface from the upper side in the gravitational direction.

14. The image forming apparatus according to claim 13, wherein when the second image forming part forms no image on the recording material, the first image forming part discharges the recording material without the recording material passing through the inverting part after forming the image on the one surface of the recording material.

15. The image forming apparatus according to claim 13, wherein when forming no image on the recording material, the first image forming part transports the recording material to the second image forming part without the recording material passing through the inverting part.

16. The image forming apparatus according to claim 13, wherein
the first image forming part includes
a toner image forming part that forms a toner image on the one surface of the recording material, and
a fixing part that heats the toner image formed by the toner image forming part and fixes the toner image on the recording material, and
when the recording material passes through the fixing part after passing through the inverting part, the fixing part reduces a fixing strength of the toner image as compared with that before the recording material passes through the inverting part.

17. The image forming apparatus according to claim 16, wherein when the recording material passes through the fixing part after passing through the inverting part, the fixing part does not perform a fixing process.

18. The image forming apparatus according to claim 13, wherein
the first image forming part includes
a first toner image forming part that forms a toner image on the one surface of the recording material, and
a first fixing part that heats the toner image formed by the first toner image forming part and fixes the toner image on the recording material,
the second image forming part includes
a second toner image forming part that forms a toner image on the one surface of the recording material from the upper side in the gravitational direction, and
a second fixing part that heats the toner image formed by the second toner image forming part and fixes the toner image on the recording material, and
the first fixing part heats the recording material when the recording material passes through the first fixing part after passing through the inverting part.

19. The image forming apparatus according to claim 13, wherein
the first image forming part includes
an image holding part that holds a toner image and faces the one surface of the recording material,
an image transfer part that rotates while sandwiching the recording material between the image holding part and the image transfer part, to transfer the toner image held on the image holding part onto the one surface of the recording material,
a power supply that applies a transfer voltage to the image holding part or the image transfer part, and
a fixing part that fixes, on the recording material, the toner image transferred by the image transfer part, and
when the recording material passes through the power supply after passing through the inverting part, the power supply reduces an absolute value of the transfer voltage as compared with that before the recording material passes through the inverting part.

20. The image forming apparatus according to claim 19, wherein the power supply does not apply a transfer voltage when the recording material passes through the power supply after passing through the inverting part.

* * * * *